(12) United States Patent
Tokunou

(10) Patent No.: US 9,346,204 B2
(45) Date of Patent: May 24, 2016

(54) INJECTION MOLDING MACHINE AND INJECTION MOLDING METHOD

(75) Inventor: Ryuichi Tokunou, Chiba (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 899 days.

(21) Appl. No.: 13/448,605

(22) Filed: Apr. 17, 2012

(65) Prior Publication Data
US 2012/0267815 A1  Oct. 25, 2012

(30) Foreign Application Priority Data

Apr. 22, 2011  (JP) .................................. 2011-096415

(51) Int. Cl.
| | | |
|---|---|---|
| *B29C 45/34* | (2006.01) | |
| *B29C 44/42* | (2006.01) | |
| *B29C 45/17* | (2006.01) | |
| *B29C 45/40* | (2006.01) | |
| *B29C 33/10* | (2006.01) | |
| *B29C 44/10* | (2006.01) | |
| *B29C 44/58* | (2006.01) | |
| *B29C 44/34* | (2006.01) | |
| *B29K 105/04* | (2006.01) | |

(52) U.S. Cl.
CPC .............. *B29C 45/174* (2013.01); *B29C 33/10* (2013.01); *B29C 44/105* (2013.01); *B29C 44/351* (2013.01); *B29C 44/42* (2013.01); *B29C 44/588* (2013.01); *B29C 45/34* (2013.01); *B29C 45/401* (2013.01); *B29C 2045/1741* (2013.01); *B29K 2105/04* (2013.01)

(58) Field of Classification Search
USPC ........................ 425/405.1, 444, 546, 556, 577
See application file for complete search history.

(56) References Cited

U.S. PATENT DOCUMENTS

| 4,153,231 A | | 5/1979 | Hayakawa et al. |
| 4,208,368 A | | 6/1980 | Egli |
| 4,474,717 A | * | 10/1984 | Hendry ........................ 264/45.5 |
| 4,479,914 A | | 10/1984 | Baumrucker |
| 4,952,365 A | * | 8/1990 | Shibuya et al. .............. 264/45.5 |
| 5,248,457 A | * | 9/1993 | Brasel et al. .................... 264/39 |
| 5,730,926 A | * | 3/1998 | Matsumoto ......... B29C 45/1734 264/500 |
| 5,972,276 A | * | 10/1999 | Yasuda ................. B29C 45/174 264/500 |

(Continued)

FOREIGN PATENT DOCUMENTS

| FR | 2 602 996 | | 2/1988 |
| JP | S53-058571 | | 5/1978 |
| JP | 61-239916 | | 10/1986 |
| JP | 63281814 A | * | 11/1988 |

(Continued)

OTHER PUBLICATIONS

Extended European Search Report dated Jul. 20, 2012.

*Primary Examiner* — Atul P. Khare
(74) *Attorney, Agent, or Firm* — IPUSA, PLLC

(57) ABSTRACT

An injection molding machine includes a gas feeding mechanism configured to feed gas to a cavity formed between a first mold plate and a second mold plate in a clamped state; an injection apparatus configured to inject a foamable resin into the cavity having an inside pressure thereof increased to be higher than an atmospheric pressure by the gas feeding mechanism; and a gas releasing mechanism configured to release the gas inside the cavity to an atmosphere through a gap formed between an inner wall surface of a through hole formed through one of the first mold plate and the second mold plate and an outer circumferential surface of a mold member inserted into the through hole, during or after the injection of the foamable resin by the injection apparatus.

7 Claims, 26 Drawing Sheets

(56) References Cited

U.S. PATENT DOCUMENTS

| | | | | |
|---|---|---|---|---|
| 6,019,918 | A * | 2/2000 | Guergov | 264/40.3 |
| 6,322,735 | B1 * | 11/2001 | Yamaki et al. | 264/69 |
| 6,367,765 | B1 * | 4/2002 | Wieder | 249/141 |
| 6,877,974 | B2 * | 4/2005 | Puniello et al. | 425/116 |
| 7,341,687 | B2 * | 3/2008 | Puniello et al. | 264/278 |
| 7,530,807 | B2 * | 5/2009 | Ho | 425/437 |
| 2004/0156938 | A1 * | 8/2004 | Hendry | 425/130 |

FOREIGN PATENT DOCUMENTS

| | | | |
|---|---|---|---|
| JP | 10180809 | A * | 7/1998 |
| JP | H11-216748 | | 8/1999 |
| JP | 11-245254 | | 9/1999 |
| JP | 2000-015668 | | 1/2000 |
| JP | 2007-054994 | | 3/2007 |
| JP | 2009-172780 | | 8/2009 |
| JP | 2010-167667 | | 8/2010 |

* cited by examiner

INJECTION MOLDING MACHINE AND INJECTION MOLDING METHOD

CROSS-REFERENCE TO RELATED APPLICATION

The present application is based upon and claims the benefit of priority of Japanese Patent Application No. 2011-096415, filed on Apr. 22, 2011, the entire contents of which are incorporated herein by reference.

BACKGROUND OF THE INVENTION

1. Field of the Invention

The present invention relates to an injection molding machine and an injection molding method.

2. Description of the Related Art

Gas counter pressure (GCP) molding is widely used as an injection molding method. (See, for example, Japanese Laid-Open Patent Application No. 61-239916.) According to GCP molding, a cavity in a molding apparatus is fed with gas, a foamable resin is injected into the cavity pressurized to a predetermined atmospheric pressure, and the cavity is evacuated during or after the injection. According to this method, a molded article is obtained that is substantially free of foaming marks on the surface and is foamed inside.

SUMMARY OF THE INVENTION

According to an aspect of the present invention, an injection molding machine includes a gas feeding mechanism configured to feed gas to a cavity formed between a first mold plate and a second mold plate in a clamped state; an injection apparatus configured to inject a foamable resin into the cavity having an inside pressure thereof increased to be higher than an atmospheric pressure by the gas feeding mechanism; and a gas releasing mechanism configured to release the gas inside the cavity to an atmosphere through a gap formed between an inner wall surface of a through hole formed through one of the first mold plate and the second mold plate and an outer circumferential surface of a mold member inserted into the through hole, during or after the injection of the foamable resin by the injection apparatus.

According to an aspect of the present invention, an injection molding method includes clamping a first mold plate and a second mold plate to form a cavity between the first mold plate and the second mold plate; feeding gas to the cavity so that a pressure inside the cavity increases to be higher than an atmospheric pressure; injecting a foamable resin into the cavity after feeding the gas; and releasing the gas inside the cavity to an atmosphere through a gap formed between an inner wall surface of a through hole formed through one of the first mold plate and the second mold plate and an outer circumferential surface of a mold member inserted into the through hole, during or after injecting the foamable resin.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
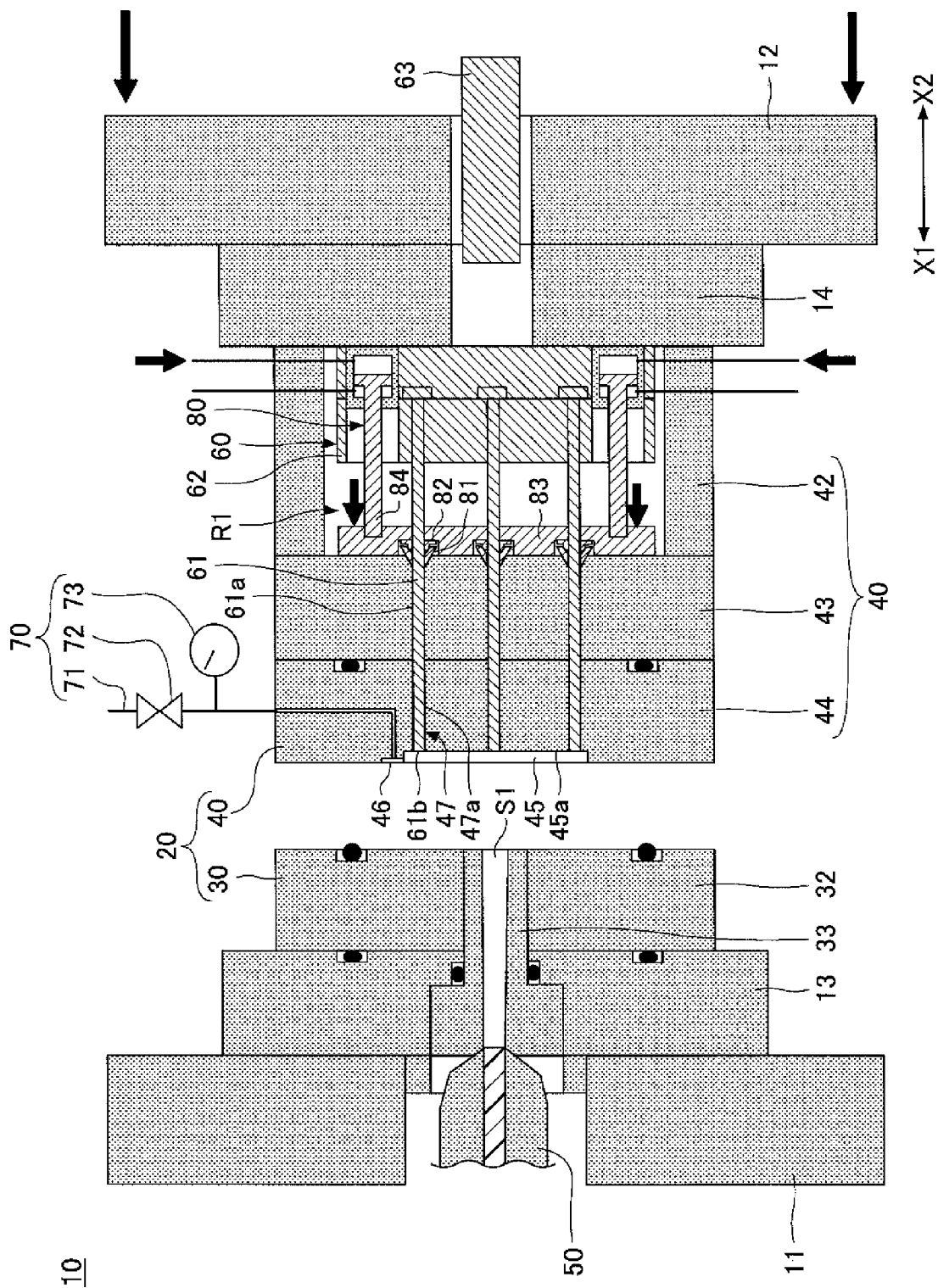
FIG. 1 is a cross-sectional view of an injection molding machine according to a first embodiment of the present invention.

As described above, Japanese Laid-Open Patent Application No. 61-239916 describes an injection molding machine that performs GCP molding. However, this injection molding machine has a pipe used exclusively for discharging gas, which complicates the configuration of the molding apparatus.

According to an aspect of the present invention, an injection molding machine and an injection molding method are provided that allow a molding apparatus to be simplified in configuration.

A description is given below, with reference to the accompanying drawings, of embodiments of the present invention. In the drawings, the same or corresponding elements are referred to by the same or corresponding reference numerals, and a redundant description thereof is omitted. Further, in the drawings, the cross sections of components forming a unitary structure with a stationary platen or a movable platen are indicated by a dot pattern. Further, in the drawings, the direction indicated by arrow X1 is a direction in which the movable platen approaches the stationary platen, and the direction indicated by arrow X2 is a direction in which the movable platen moves away from the stationary platen. For convenience of description, the stationary platen side and the movable platen side in an injection molding machine are referred to as the front side and the rear side, respectively.

First Embodiment

Figure 2:
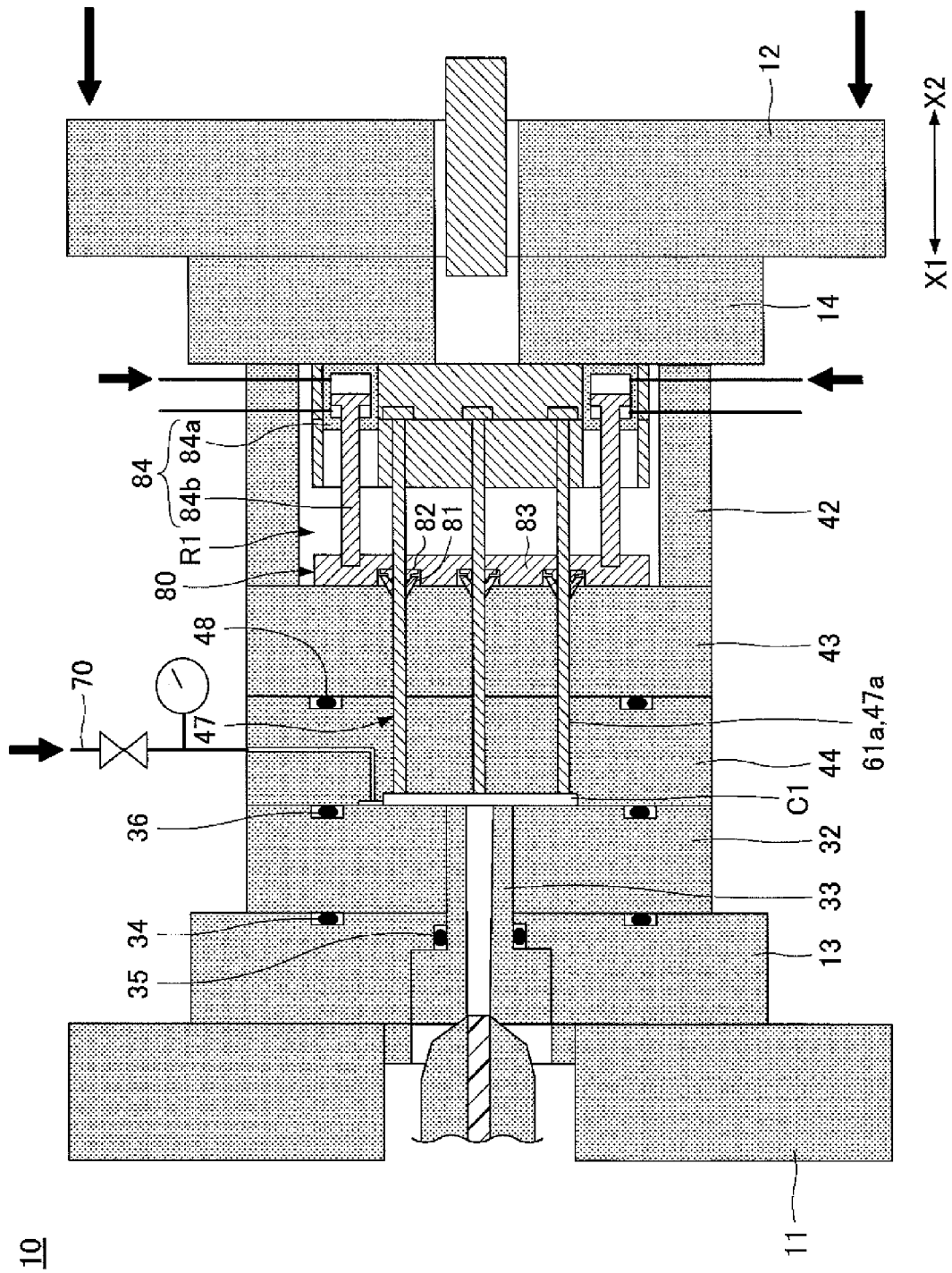
FIG. 2 is another cross-sectional view of the injection molding machine according to the first embodiment of the present invention.
Figure 3:
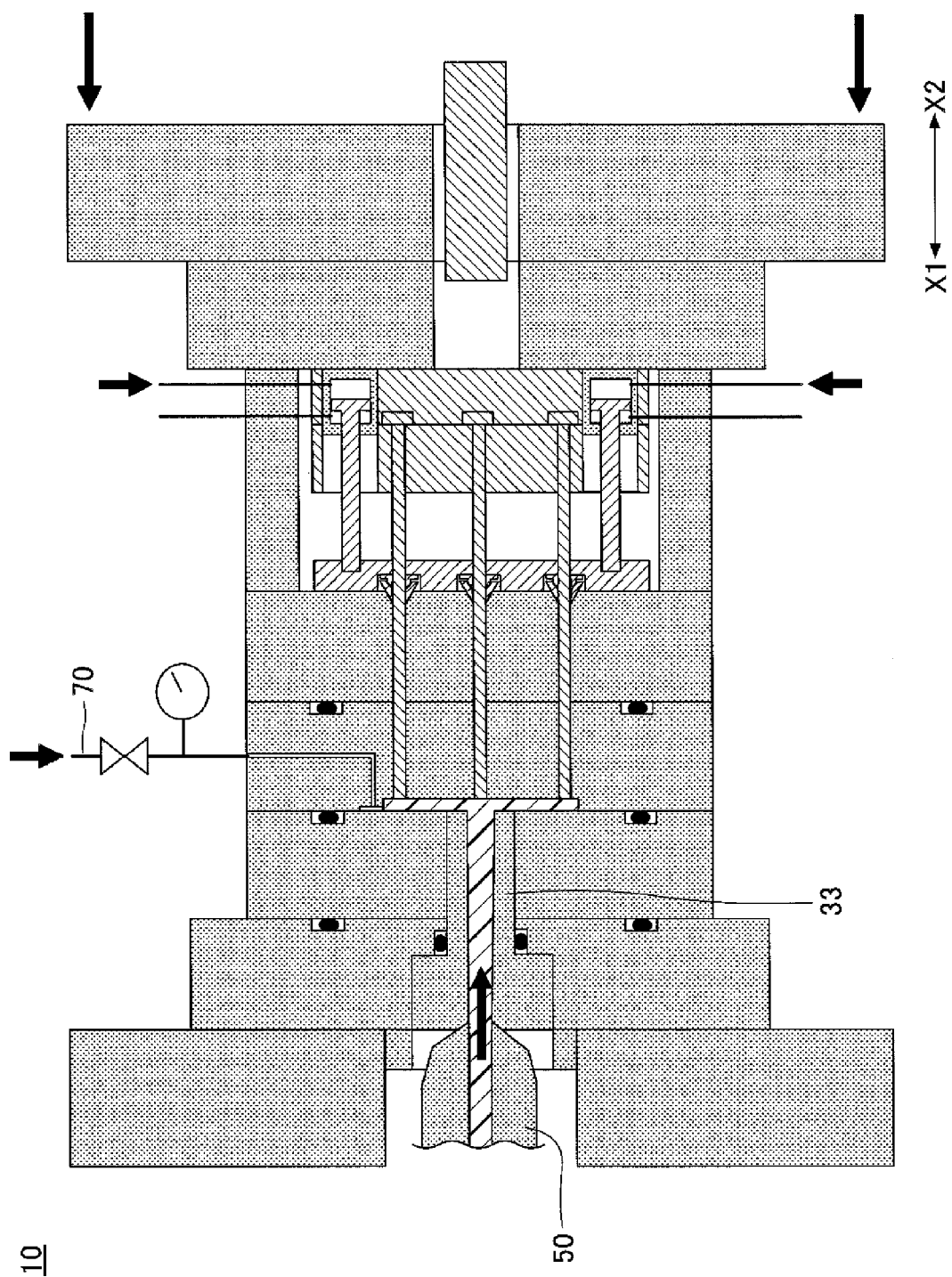
FIG. 3 is another cross-sectional view of the injection molding machine according to the first embodiment of the present invention.
Figure 4:
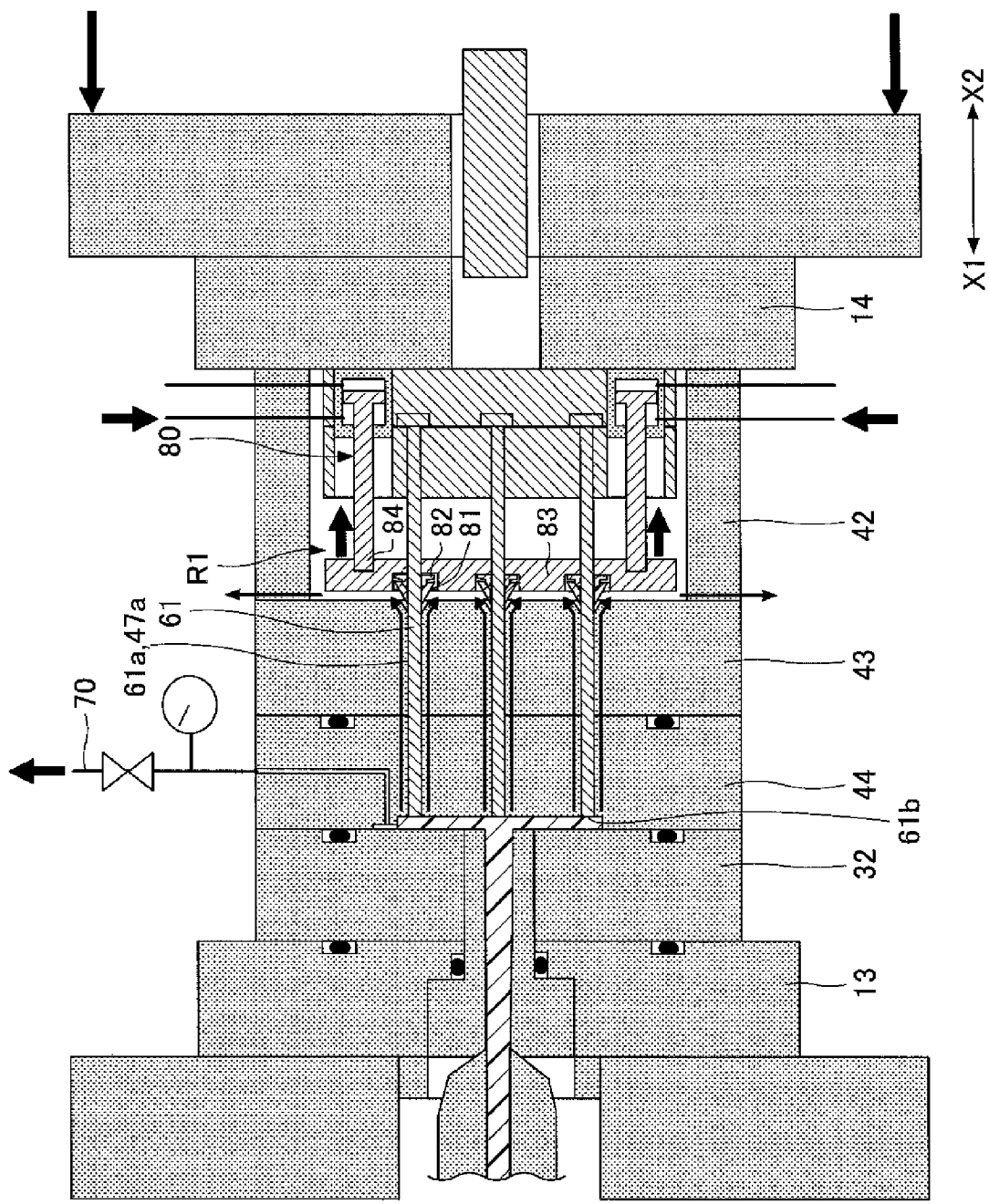
FIG. 4 is another cross-sectional view of the injection molding machine according to the first embodiment of the present invention.
Figure 5:
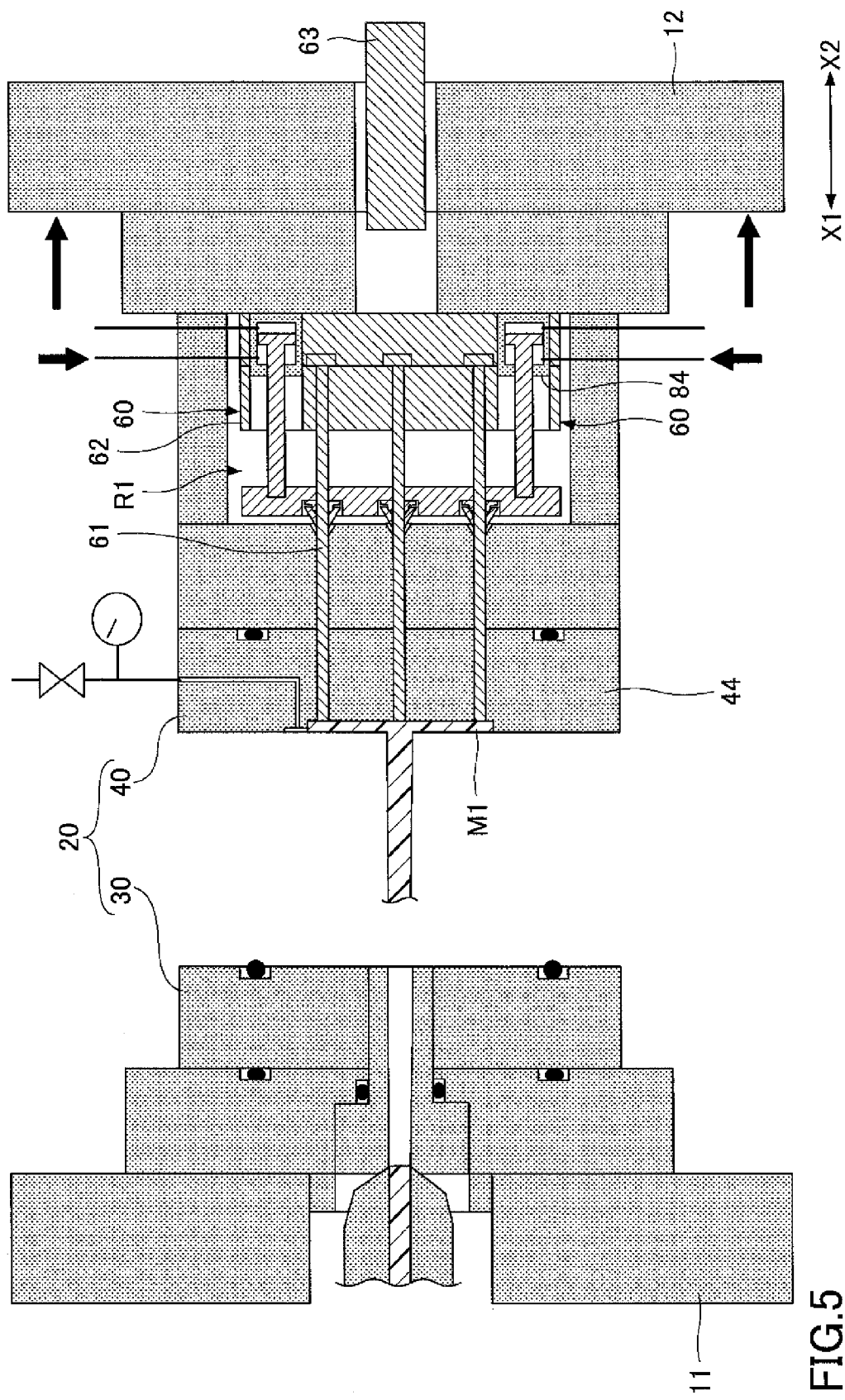
FIG. 5 is another cross-sectional view of the injection molding machine according to the first embodiment of the present invention.
Figure 6:
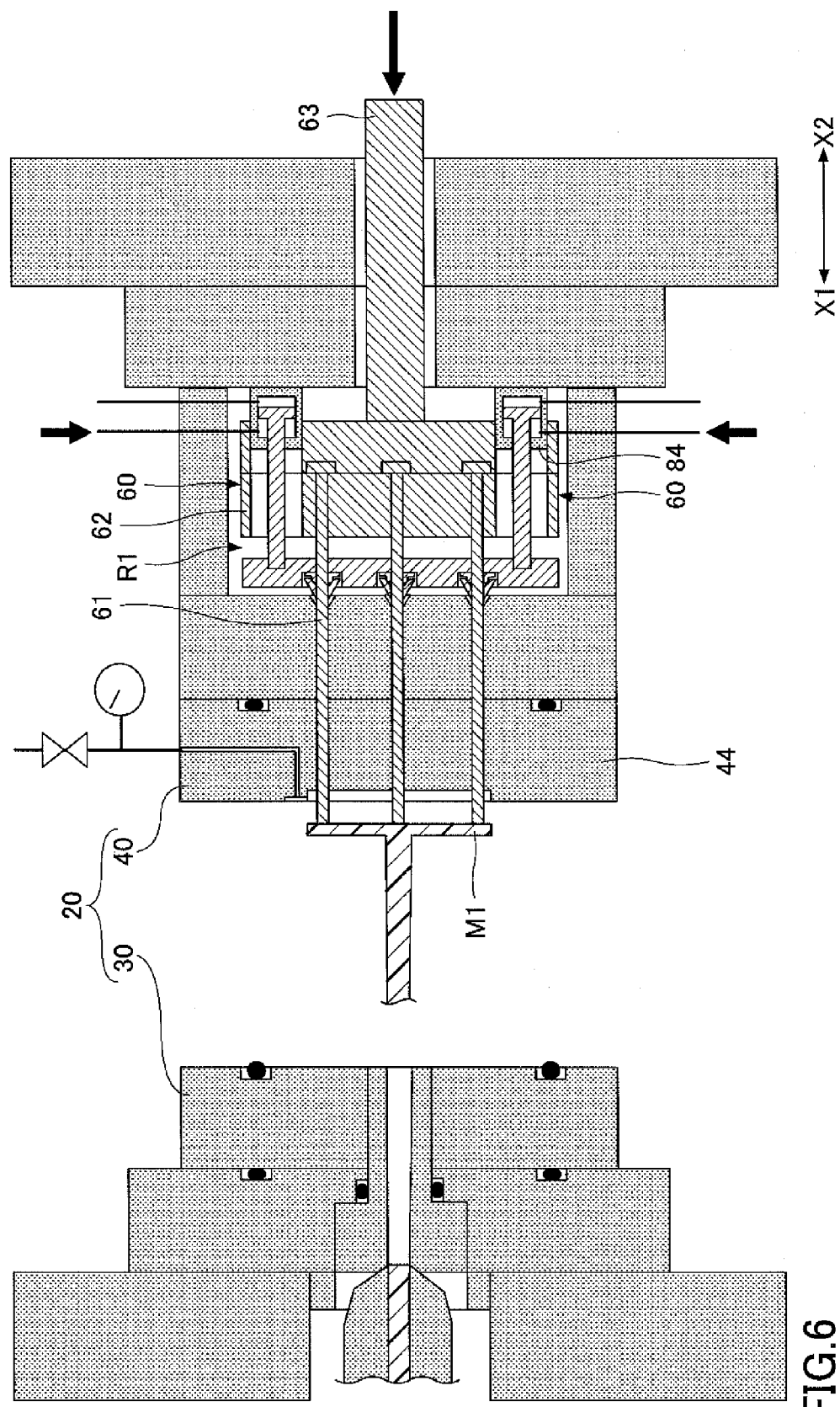
FIG. 6 is another cross-sectional view of the injection molding machine according to the first embodiment of the present invention.

FIG. 1 through FIG. 6 are cross-sectional views of an injection molding machine 10 according to a first embodiment of the present invention. FIG. 1 is a cross-sectional view of the injection molding machine 10 in a mold closing process. FIG. 2 is a cross-sectional view of the injection molding machine 10 in a gas feeding process after a mold clamping process. FIG. 3 is a cross-sectional view of the injection molding machine 10 in an injection process. FIG. 4 is a cross-sectional view of the injection molding machine 10 in a gas releasing process. FIG. 5 is a cross-sectional view of the injection molding machine 10 in a mold opening process. FIG. 6 is a cross-sectional view of the injection molding machine 10 in a molded article ejecting process.

Figure 7:
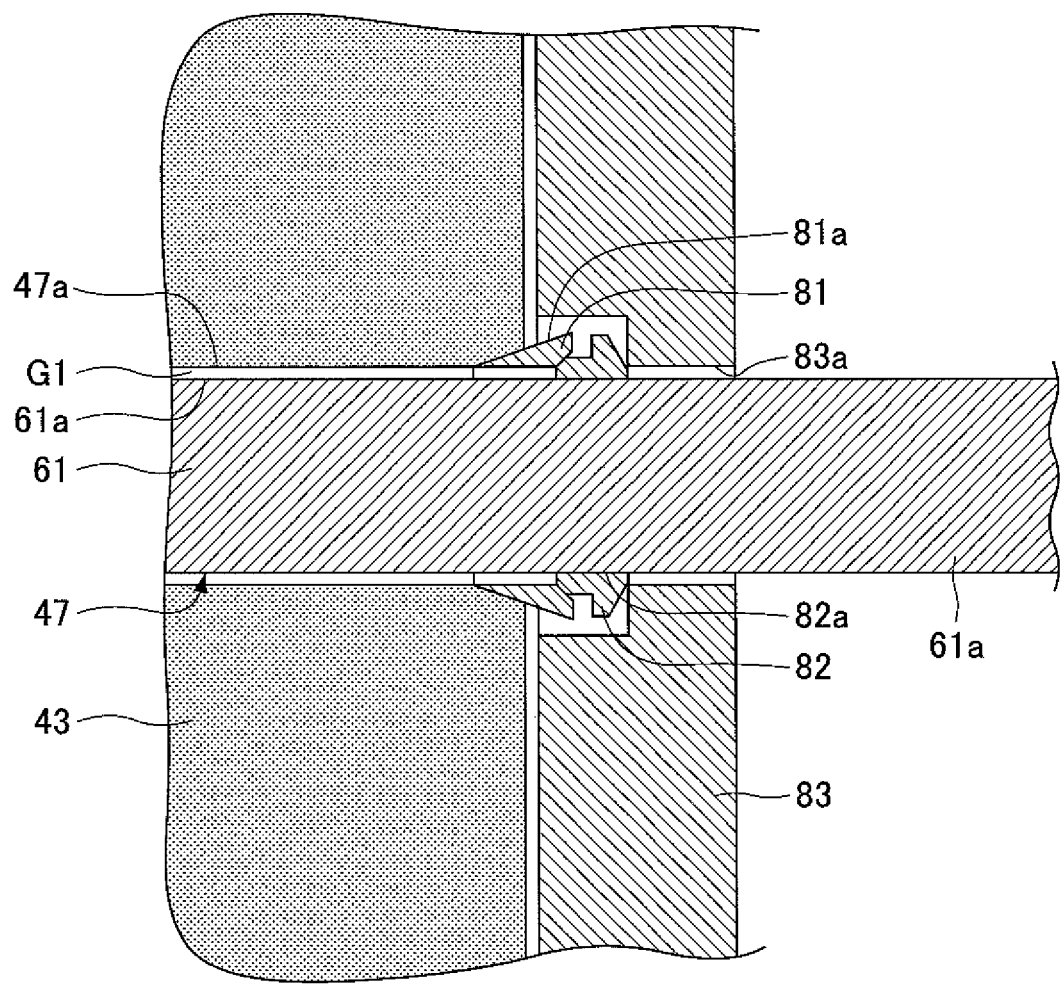
FIG. 7 is an enlarged view of part of the cross-sectional view of FIG. 2.
Figure 8:
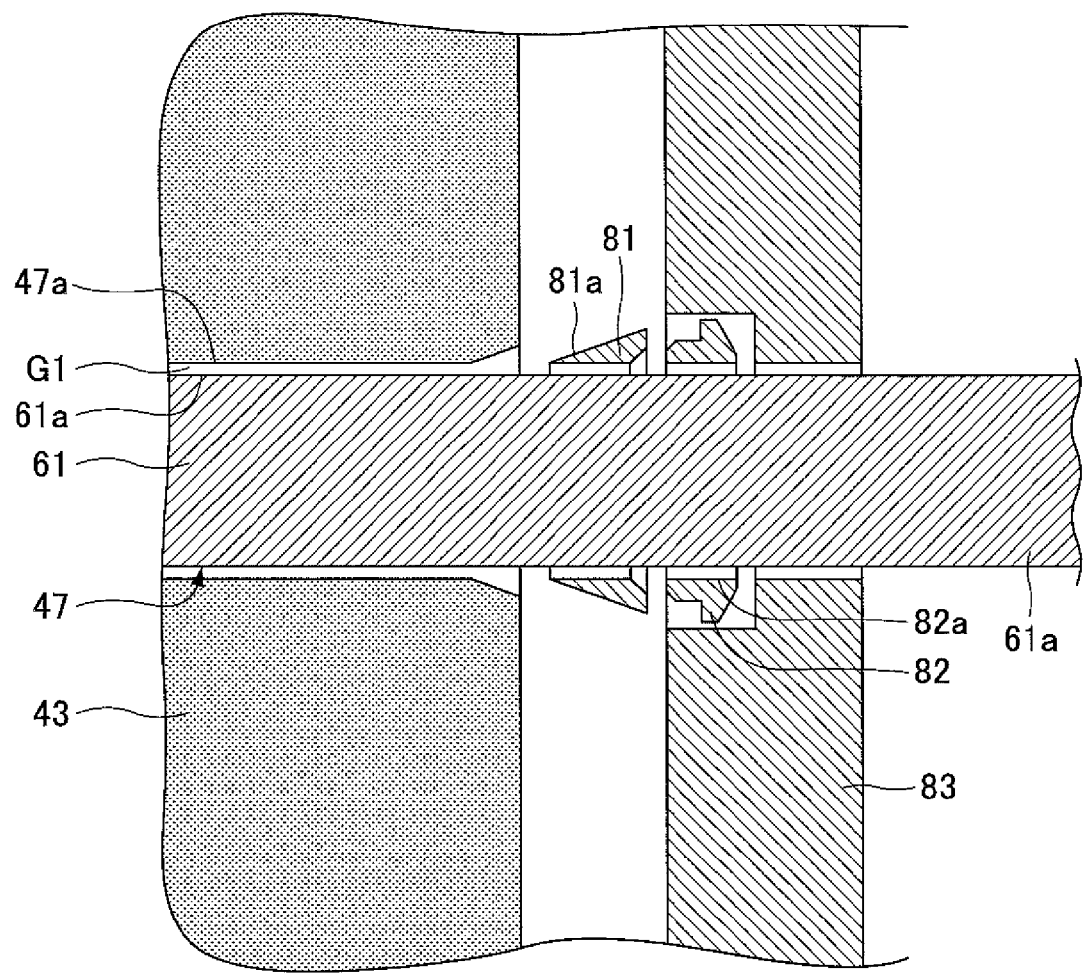
FIG. 8 is an enlarged view of part of the cross-sectional view of FIG. 4.

FIG. 7 is an enlarged view of part of the cross-sectional view of FIG. 2. FIG. 8 is an enlarged view of part of the cross-sectional view of FIG. 4.

Referring to FIG. 1, the injection molding machine 10 includes a molding apparatus 20, an injection apparatus 50, an ejector apparatus 60, a gas feeding and discharging mechanism 70, and a gas releasing mechanism 80. The injection apparatus 50 injects a foamable resin into a cavity C1 (FIG. 2) inside the molding apparatus 20 in a mold clamped state. In order to control the foaming of the foamable resin during its injection, the gas feeding and discharging mechanism 70 pre-feeds the cavity C1 with gas so that the pressure inside the cavity C1 increases to be higher than an atmospheric pressure. During or after the injection of the foamable resin, the gas feeding and discharging mechanism 70 and the gas releasing mechanism 80 release the gas inside the cavity C1 to the atmosphere through a pressure difference. At this point, the foamable resin is foamed so that a molded article M1 (FIG. 5) is obtained that is substantially free of foaming marks on the surface and is foamed inside. Thereafter, the ejector apparatus 60 pushes the molded article M1 out of (ejects the molded article M1 from) the molding apparatus 20 in a mold open state.

A description is given below of components of the injection molding machine 10.

The molding apparatus 20 includes a stationary mold 30 as a first mold and a movable mold 40 as a second mold. The stationary mold 30 is fixed to a stationary platen 11 via a stationary adapter plate 13. The movable mold 40 is attached to a movable platen 12 via a movable adapter plate 14. A toggle mechanism (not graphically illustrated) is attached to the movable platen 12. The stationary platen 11, the movable platen 12, the stationary adapter plate 13, the movable adapter plate 14, and the toggle mechanism may form a mold clamping apparatus.

As illustrated in FIG. 1, the forward rotation of a drive motor (not graphically illustrated) of the mold clamping apparatus causes the movable platen 12 to move forward in a direction indicated by arrow X1, so that the movable mold 40 approaches the stationary mold 30 to close the molding apparatus 20. At this point, the rpm of the drive motor is controlled. After the molding apparatus 20 is closed, torque control is performed on the forward rotation of the drive motor, so that the molding apparatus 20 is clamped as illustrated in FIG. 2. At the time of mold clamping, the cavity C1 is formed between the stationary mold 30 and the movable mold 40. Further, by the reverse rotation of the drive motor, the movable platen 12 is caused to move backward in a direction indicated by arrow X2 as illustrated in FIG. 5. As a result, the movable mold 40 is detached and moves away from the stationary mold 30, so that the molding apparatus 20 is opened. The mold clamping apparatus may have a common configuration. Further, the drive motor may be replaced with a hydraulic cylinder. In this case, a ball screw mechanism may be omitted that converts the rotational motion of the drive motor into a linear motion and transmits the linear motion to the movable platen 12.

As illustrated in FIG. 1, the stationary mold 30 includes a stationary mold plate 32 supported by the stationary adapter plate 13. A sprue bushing 33 that penetrates through the stationary mold plate 32 and the stationary adapter plate 13 includes a sprue S1 as a feed channel for feeding a foamable resin. The sprue bushing 33 is so fixed to the stationary adapter plate 13 with bolts or the like as to be replaceable when the sprue bushing 33 is degraded.

Seal members 34 and 36 (FIG. 2) are attached to, for example, the stationary mold 30. A seal member 35 is attached to, for example, the stationary adapter plate 13. The seal members 34 through 36 are so arranged as to surround the sprue bushing 33. The seal members 34 through 36 are annularly formed. Examples of the seal members 34 through 36 include an O-ring. The seal member 34 seals the gap formed between the stationary mold plate 32 and the stationary adapter plate 13. The seal member 35 seals the gap formed between the stationary adapter plate 13 and the sprue bushing 33. The seal member 36 seals the gap formed between the stationary mold plate 32 and the movable mold plate 44 at the time of clamping the molding apparatus 20.

As illustrated in FIG. 1, the movable mold 40 includes, as a unit, a spacer block 42, a support plate 43, and a movable mold plate 44, which are arranged in this order from the movable mold adapter plate 14 side. The movable mold plate 44 and the stationary mold plate 32 are caused to come into contact and are clamped, so that the cavity C1 is formed.

A recess (depressed part) 45 to form the cavity C1 and a groove part 46 are adjacently formed on the parting surface of the movable mold plate 44, which is a surface to come into contact with the stationary mold plate 32. The groove part 46 is shallower (smaller in depth) than the recess 45 in order to prevent a foamable resin from entering the groove part 46.

A room (space) R1 surrounded by the spacer block 42 is formed between the movable adapter plate 14 and the support plate 43. The room R1 is formed for the below-described operations of the ejector apparatus 60 and the gas releasing mechanism 80.

One or more ejector pin holes 47, into which one or more ejector pins 61 are movably inserted, are formed through the movable mold plate 44 and the support plate 43. The inside diameter of the ejector pin holes 47 is slightly larger than the outside diameter of the ejector pins 61.

A seal member 48 (FIG. 2) is attached to the movable mold 40. The seal member 48 seals the gap formed between the movable mold plate 44 and the support plate 43. The seal member 48 is annularly formed and is so disposed as to surround the ejector pin holes 47.

As illustrated in FIG. 3, the injection apparatus 50 is pressed against the sprue bushing 33 to inject a given amount of foamable resin into the cavity C1 via the sprue S1. The foamable resin is, for example, a mixture of a heated, molten resin and a blowing gas as a foaming agent. The blowing gas is in its critical state when mixed with the resin. The blowing gas is not limited in particular, and may be, for example, carbon dioxide, nitrogen, air, or the like. The injection apparatus 50 may contain a needle valve mechanism configured to open and close a nozzle hole for injecting a foamable resin.

As illustrated in FIG. 6, the ejector apparatus 60 pushes out the molded article M1, molded inside the cavity C1, from the movable mold plate 44 after the molding apparatus 20 is opened. The ejector apparatus 60 includes the ejector pins 61, an ejector plate 62, and an ejector rod 63. The ejector pins 61 are movable relative to the movable mold plate 44. The ejector pins 61 and the ejector plate 62 are movable as a unit. The ejector rod 63 pushes the ejector plate 62 from its rear side.

The ejector plate 62 is disposed inside the room R1, and is so supported by below-described hydro pneumatic cylinders 84 (specifically, cylinder bodies 84a) as to be movable in the directions indicated by arrows X1 and X2. The ejector plate 62 is urged in the backward direction (the direction indicated by arrow X2) by an urging member such as a spring.

As illustrated in FIG. 6, as the ejector rod 63 moves forward, the ejector plate 62 is pushed from the rear side to move forward against the urging force of the spring. As a result, the ejector pins 61 are caused to move forward relative to the movable mold plate 44 to push the molded article M1 out of the movable mold plate 44.

Thereafter, as illustrated in FIG. 1, as the ejector rod 63 moves backward, the ejector plate 62 is caused to move backward by the urging force of the spring to come into contact with the movable adapter plate 14 and stop. At this point, respective end faces 61b of the ejector pins 61 are substantially in the same plane as an inside bottom surface 45a of the recess 45 to form part of a wall surface of the cavity C1 at the time of mold clamping.

Referring to FIG. 1, the gas feeding and discharging mechanism 70 includes a gas feeding and discharging pipe 71 for feeding gas to and discharging gas from the cavity C1. The gas feeding and discharging pipe 71 is connected via the groove part 46 to the recess 45, which forms the cavity C1. An on-off valve 72 and a gas manometer 73 are provided in the gas feeding and discharging pipe 71.

As illustrated in FIG. 2, the gas feeding and discharging mechanism 70 feeds the cavity C1 with gas so that the pressure inside the cavity C1 increases to be higher than an atmospheric pressure before the injection apparatus 50 injects a foamable resin after the molding apparatus 20 is clamped. The pressure inside the cavity C1 is substantially the same as the pressure of the blowing gas in the injection apparatus 50, for example, 3 MPa to 14.5 MPa.

As illustrated in FIG. 4, the gas releasing mechanism 80 releases the gas inside the cavity C1 to the atmosphere using a pressure difference during or after the injection of the foamable resin by the injection apparatus 50. At this point, the foamable resin is foamed, so that the molded article M1 (FIG. 5) is obtained that is substantially free of foaming marks on the surface and is foamed inside.

The gas feeding and discharging mechanism 70 may also release the gas inside the cavity C1 to the atmosphere using a pressure difference in combination with the gas releasing mechanism 80. This increases the degassing (gas releasing) rate, so that generation of minute irregularities due to residual gas is prevented and the molded article M1 is obtained with good quality of appearance.

Referring also to FIG. 8, the gas releasing mechanism 80 releases the gas inside the cavity C1 to the atmosphere using a pressure difference through a gap G1 formed between an inner wall surface 47a of each ejector pin hole 47 and an outer circumferential (peripheral) surface 61a of the corresponding ejector pin 61. The gas inside the cavity C1 passes through the gap G1 to be released to the room R1, and is thereafter released to the atmosphere through a gap formed between the support plate 43 and the spacer block 42 surrounding the room R1.

Thus, according to this embodiment, the existing gaps G1, which have been formed for another purpose, are used as a gas releasing channel. Therefore, it is possible to simplify the configuration of the molding apparatus 20. This makes it easy to design the molding apparatus 20, so that it is possible to reduce the cost of the molding apparatus 20. Further, it is possible to reduce the molding apparatus 20 in size.

Further, according to this embodiment, the end faces 61b (FIG. 1) of the ejector pins 61 forming a gas releasing channel form part of a wall surface of the cavity C1. This allows the gas inside the cavity C1 to be swiftly released to the atmosphere.

The gas releasing mechanism 80 includes an opening and closing mechanism configured to open and close a gas releasing channel including the gaps G1 (FIG. 7 and FIG. 8). As illustrated in FIG. 4, this opening and closing mechanism includes first ferrules 81, second ferrules 82, a seal plate 83, and the hydro pneumatic cylinders 84.

The first ferrules 81 and the second ferrules 82 are annular, and have respective holes for inserting the corresponding ejector pins 61 formed in their respective center portions. The inside diameter of the first ferrules 81 and the second ferrules 82 is slightly larger than the outside diameter of the ejector pins 61. The first ferrules 81 are provided one for each of the ejector pins 61. The second ferrules 82 are provided one for each of the ejector pins 61.

The seal plate 83 is so disposed inside the room R1 as to be movable in the directions indicated by arrows X1 and X2. Insertion holes 83a (FIG. 7) into which the ejector pins 61 are movably inserted are formed through the seal plate 83.

The hydro pneumatic cylinders 84 are hydraulic cylinders or pneumatic cylinders. Referring to FIG. 2, each of the hydro pneumatic cylinders 84 includes the cylinder body 84a and a rod 84b projecting from the cylinder 84. As illustrated in FIG. 4, the hydro pneumatic cylinders 84 are connected to the movable adapter plate 14 at their respective rear end portions (for example, cylinder bodies 84a), and are connected to the seal plate 83 at their respective front end portions (for example, rods 84b). With the extension and retraction of the hydro pneumatic cylinders 84, the seal plate 83 and the first and second ferrules 81 and 82 are caused to move forward and backward in the directions indicated by arrows X1 and X2 to move toward and away from the support plate 43.

As illustrated in FIG. 2, the extension of the hydro pneumatic cylinders 84 causes the first and second ferrules 81 and 82 to be held between the seal plate 83 and the support plate 43 and axially compressed. At this point, as illustrated in FIG. 7, an exterior surface 81a of the first ferrule 81 is pressed against the inner wall surface 47a of the corresponding ejector pin holes 47. Further, at this point, the first ferrule 81 compresses the second ferrule 82 radially inward. As a result, an inner circumferential surface 82a of the second ferrule 82 is pressed against the outer circumferential surface 61a of the ejector pin 61, so that the gas releasing channel including the gaps G1 is closed.

Further, as illustrated in FIG. 4, the retraction of the hydro pneumatic cylinders 84 causes the seal plate 83 to move backward, so that the pressures on the first and second ferrules 81 and 82 in their axial directions are removed. As a result, as illustrated in FIG. 8, the second ferrule 82 is elastically restored to its original state, so that the inner circumferential surface 82a of the second ferrule 82 is separated from the outer circumferential surface 61a of the ejector pin 61. Further, the exterior surface 81a of the first ferrule 81 is detached from (comes out of contact with) the inner wall surface 47a of the ejector pin hole 47 because of a difference in pressure between the gaps G1 and the room R1. As a result, the gas releasing channel including the gaps G1 is opened.

The gas releasing mechanism 80 opens and closes the gas releasing channel including the gaps G1 in this manner.

Next, a description is given, with reference again to FIG. 1 through FIG. 6, of an operation (an injection molding method) of the injection molding machine 10 having the above-described configuration. The below-described operations are controlled by a controller (not graphically illustrated) implemented by a computer including a central processing unit (CPU), a recording medium, a timer, etc. The controller may be connected to or provided in the injection molding machine 10.

First, as illustrated in FIG. 1, the mold clamping apparatus causes the movable platen 12 to move forward in the direction indicated by arrow X1, so that the movable mold 40 approaches the stationary mold 30 to close the molding apparatus 20. When the movable mold plate 44 comes into contact with the stationary mold plate 32, a limit switch is turned ON, so that the timer (of the controller) starts counting (measuring) time.

Further, as illustrated in FIG. 1 and FIG. 7, the gas releasing mechanism 80 closes the gas releasing channel including the gaps G1. This process is performed before the feeding of gas by the gas feeding and discharging mechanism 70. This process may be performed after the clamping of the molding apparatus 20.

Next, as illustrated in FIG. 2, the movable mold plate 44 is pressed against the stationary mold plate 32, so that the molding apparatus 20 is clamped. The movable mold plate 44 and the stationary mold plate 32 are clamped so that the cavity C1 is formed.

Next, the gas feeding and discharging mechanism 70 fees gas into the cavity C1, so that the pressure inside the cavity C1 increases to be higher than an atmospheric pressure. Increasing the pressure inside the cavity C1 is started when the time counted (measured) by the timer reaches a predetermined set time T1. At this point, the gas releasing mechanism 80 closes the gas releasing channel including the gaps G1.

Next, as illustrated in FIG. 3, the injection apparatus 50 injects a foamable resin into the cavity C1 through the sprue S1. The injection of the foamable resin is started when the time counted by the timer reaches a predetermined set time T2 (T2>T1). The gas feeding and discharging mechanism 70 keeps the pressure inside the cavity C1 constant for a predetermined time after the start of the injection of the foamable resin.

Thereafter, as illustrated in FIG. 4, when the injection of the foamable resin ends, the gas releasing mechanism 80 opens the gas releasing channel including the gaps G1, and releases the gas inside the cavity C1 to the atmosphere using a pressure difference. The gas inside the cavity C1 is released to the room R1 through the gaps G1, and is thereafter released to the atmosphere through a gap formed between the support plate 43 and the spacer block 42 surrounding the room R1. At this point, the gas feeding and discharging mechanism 70, along with the gas releasing mechanism 80, releases the gas inside the cavity C1 to the atmosphere using a pressure difference. The release of gas is started when the time counted by the timer reaches a predetermined set time T3 (T3>T2). The return of the pressure inside the cavity C1 to an atmospheric pressure causes the foamable resin to be foamed inside the cavity C1, so that the molded article M1 (FIG. 5) is obtained that is substantially free of foaming marks on the surface and is foamed inside. The release of gas may also be started during the injection of the foamable resin.

Next, as illustrated in FIG. 5, the mold clamping apparatus causes the movable platen 12 to move backward in the direction indicated by arrow X2, so that the movable mold 40 is separated from (comes out of contact with) the stationary mold 30 to open the molding apparatus 20. The foamable resin may also be foamed by substantially increasing the volume of the cavity C1 by opening the molding apparatus 20.

Finally, as illustrated in FIG. 6, the ejector apparatus 60 pushes the molded article M1 out of the movable mold plate 44. For example, the ejector plate 62 is pushed from the rear side by the forward movement of the ejector rod 63 to move forward in the direction indicated by arrow X1 against the urging force of a spring. Accordingly, the ejector pins 61 are caused to move forward relative to the movable mold plate 44 to push the molded article M1 out of the movable mold plate 44. Thus, the molded article M1 is obtained.

First Variation of First Embodiment

Figure 9:
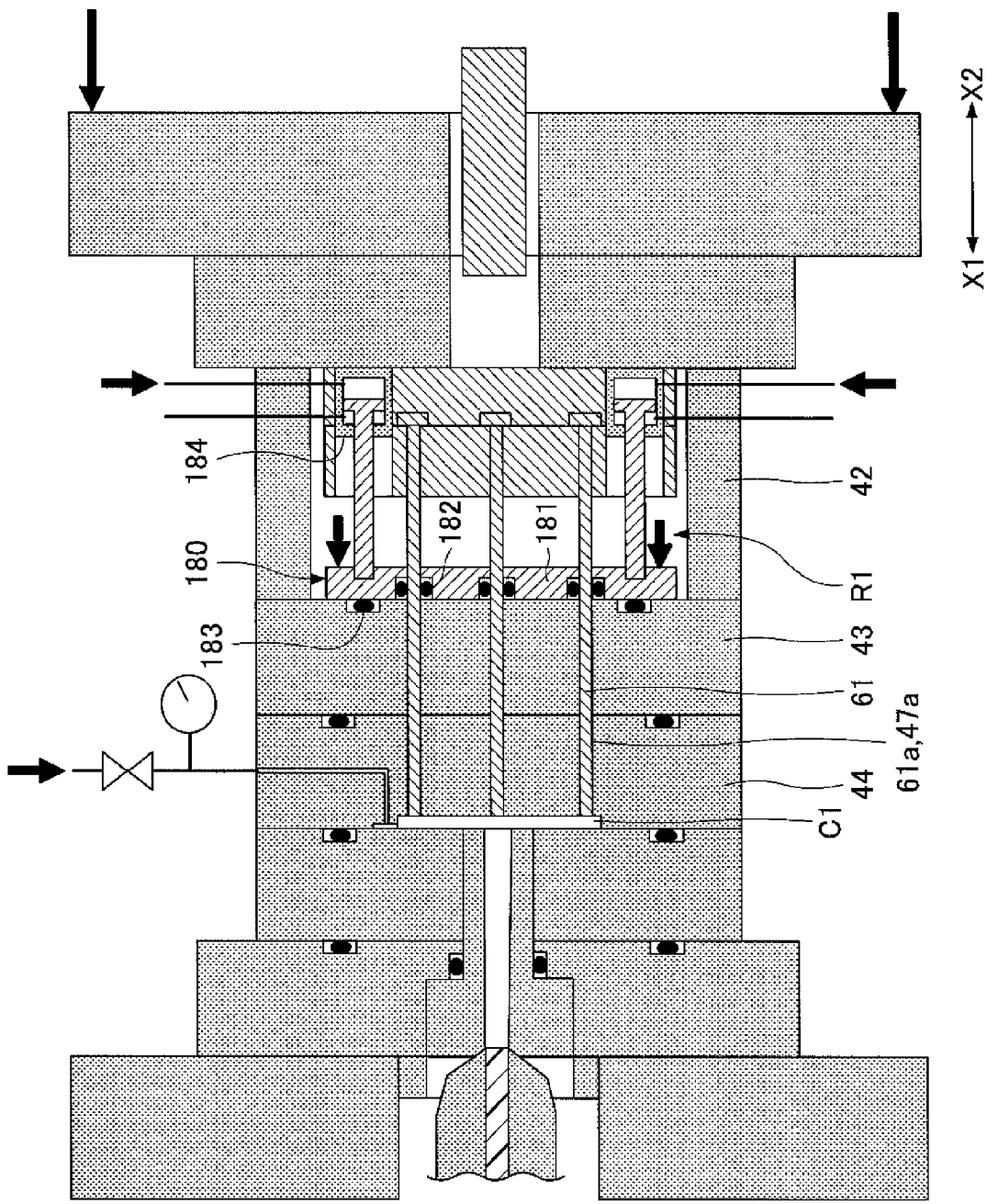
FIG. 9 is a cross-sectional view of an injection molding machine according to a first variation of the first embodiment of the present invention.
Figure 10:
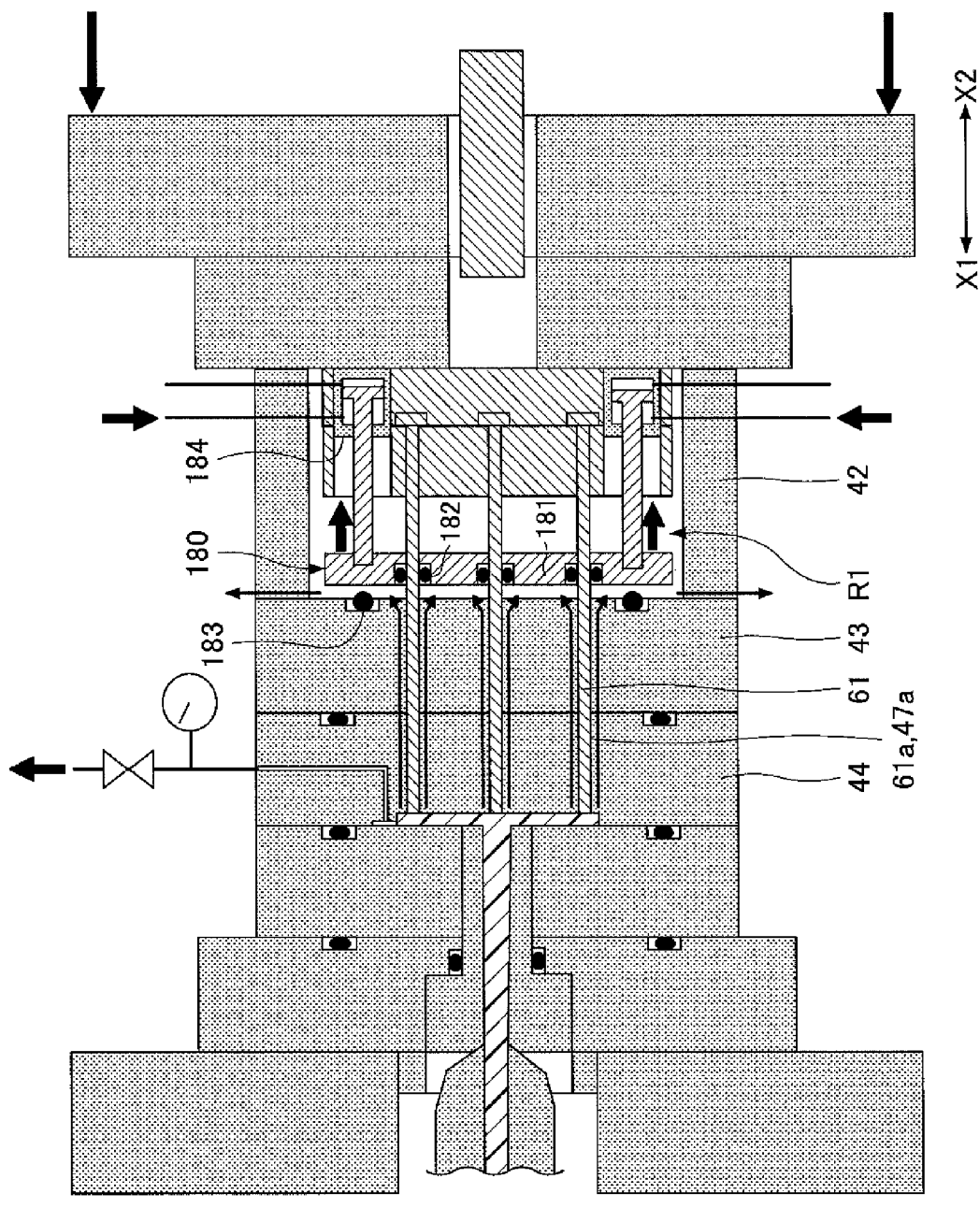
FIG. 10 is a cross-sectional view of the injection molding machine according to the first variation of the first embodiment of the present invention.

FIG. 9 and FIG. 10 are cross-sectional views of an injection molding machine 110 according to a first variation of the first embodiment of the present invention. FIG. 9 is a cross-sectional view of the injection molding machine 110 in a gas feeding process after a mold clamping process. FIG. 10 is a cross-sectional view of the injection molding machine 110 in a gas releasing process. The injection molding machine 110 according to this variation has the same configuration as the injection molding apparatus 10 of the above-described embodiment except for a gas releasing mechanism 180.

Accordingly, a description of the configuration other than the gas releasing mechanism 180 is omitted.

The gas releasing mechanism 180 of this variation includes a seal plate 181, seal members 182 and 183, and hydro pneumatic cylinders 184 as an opening and closing mechanism configured to open and close a gas releasing channel including the gaps G1 (FIG. 7 and FIG. 8).

The seal plate 181 is so disposed inside the room R1 as to be movable in the directions indicated by arrows X1 and X2. Insertion holes into which the ejector pins 61 are movably inserted are formed through the seal plate 181.

The seal members 182 are annular, and are so fixed to the seal plate 181 as to surround the corresponding ejector pins 61. The seal members 182 seal the gaps formed between the seal plate 181 and the ejector pins 61. The seal members 182 are provided one for each of the ejector pins 61.

The seal member 183 is annular, and is so fixed to the support plate 43 (or the seal plate 181) as to surround the ejector pins 61. The support plate 43 and the seal plate 181 come into and out of contact with each other through the seal member 183, so that the gas releasing channel including the gaps G1 is closed and opened.

The hydro pneumatic cylinders 184 are connected to the movable adapter plate 14 at their respective rear end portions, and are connected to the seal plate 181 at their respective front end portions. The extension and retraction of the hydro pneumatic cylinders 184 cause the seal plate 181 to move forward and backward.

As illustrated in FIG. 9, the extension of the hydro pneumatic cylinders 184 causes the seal plate 181 to move forward in the direction indicated by arrow X1 to come into contact with the support plate 43 through the seal member 183. As a result, the gas releasing channel including the gaps G1 is closed.

As illustrated in FIG. 10, the retraction of the hydro pneumatic cylinders 184 causes the seal plate 181 to move backward in the direction indicated by arrow X2 to be separated from the seal member 183. As a result, the gas releasing channel including the gaps G1 is opened.

The gas releasing mechanism 180 opens and closes the gas releasing channel including the gaps G1 in this manner.

Second Variation of First Embodiment

Figure 11:
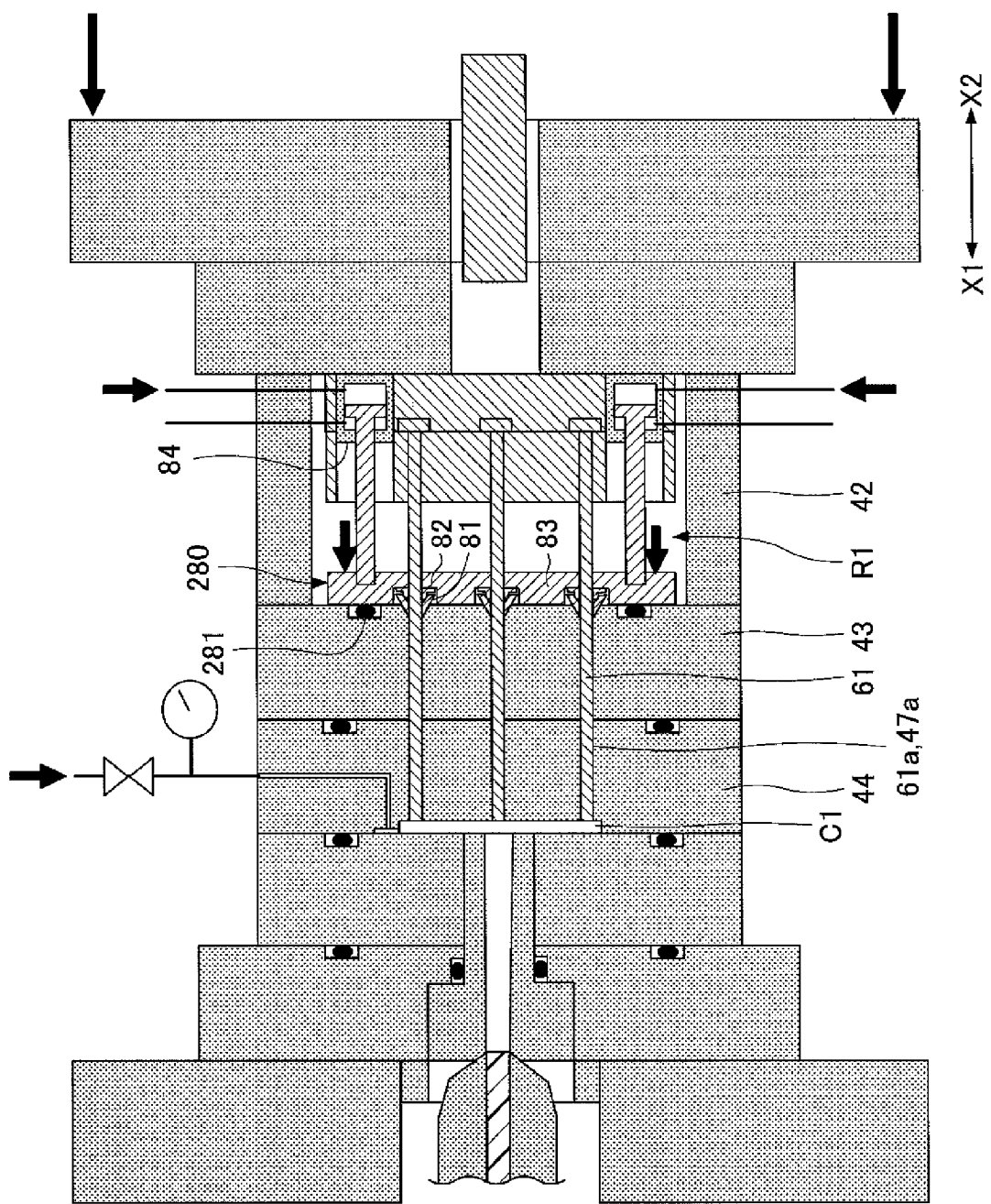
FIG. 11 is a cross-sectional view of an injection molding machine according to a second variation of the first embodiment of the present invention.
Figure 12:
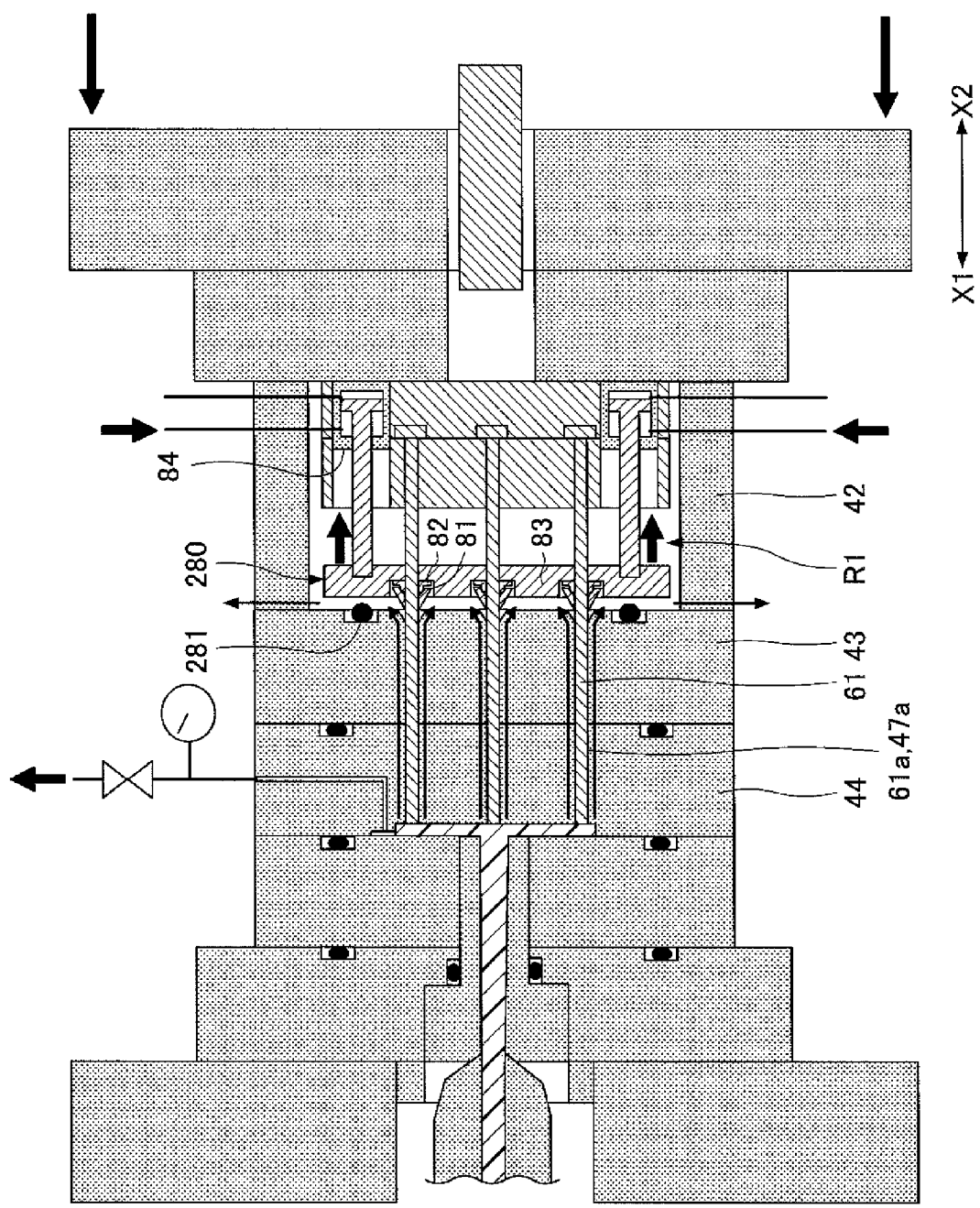
FIG. 12 is a cross-sectional view of the injection molding machine according to the second variation of the first embodiment of the present invention.

FIG. 11 and FIG. 12 are cross-sectional views of an injection molding machine 210 according to a second variation of the first embodiment of the present invention. FIG. 11 is a cross-sectional view of the injection molding machine 210 in a gas feeding process after a mold clamping process. FIG. 12 is a cross-sectional view of the injection molding machine 210 in a gas releasing process. The injection molding machine 210 according to this variation has the same configuration as the injection molding apparatus 10 of the above-described embodiment except for a gas releasing mechanism 280. Accordingly, a description of the configuration other than the gas releasing mechanism 280 is omitted.

The gas releasing mechanism 280 of this variation includes the first and second ferrules 81 and 82, the seal plate 83, the hydro pneumatic cylinders 84, and a seal member 281 as an opening and closing mechanism configured to open and close a gas releasing channel including the gaps G1 (FIG. 7 and FIG. 8).

The seal member 281 is annular, and is so fixed to the support plate 43 (or the seal plate 83) as to surround the ejector pins 61. The support plate 43 and the seal plate 83 come into and out of contact with each other through the seal member 281, so that the gas releasing channel including the gaps G1 is closed and opened.

The gas releasing mechanism 280 of this variation includes the seal member 281. Accordingly, it is still possible to disconnect the cavity C1 from the atmosphere even when the first ferrules 81 are degraded.

Second Embodiment

Figure 13:
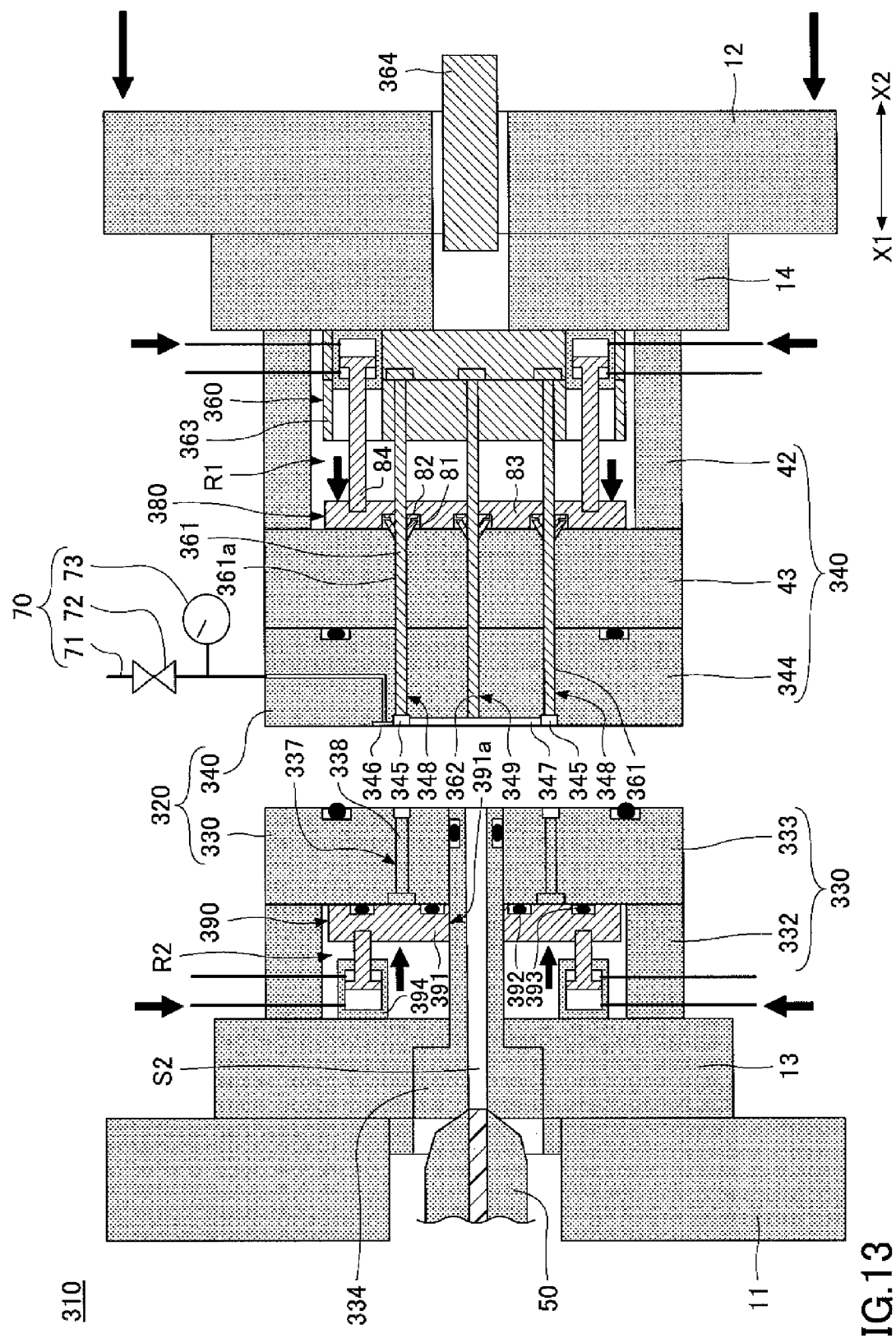
FIG. 13 is a cross-sectional view of an injection molding machine according to a second embodiment of the present invention.
Figure 14:
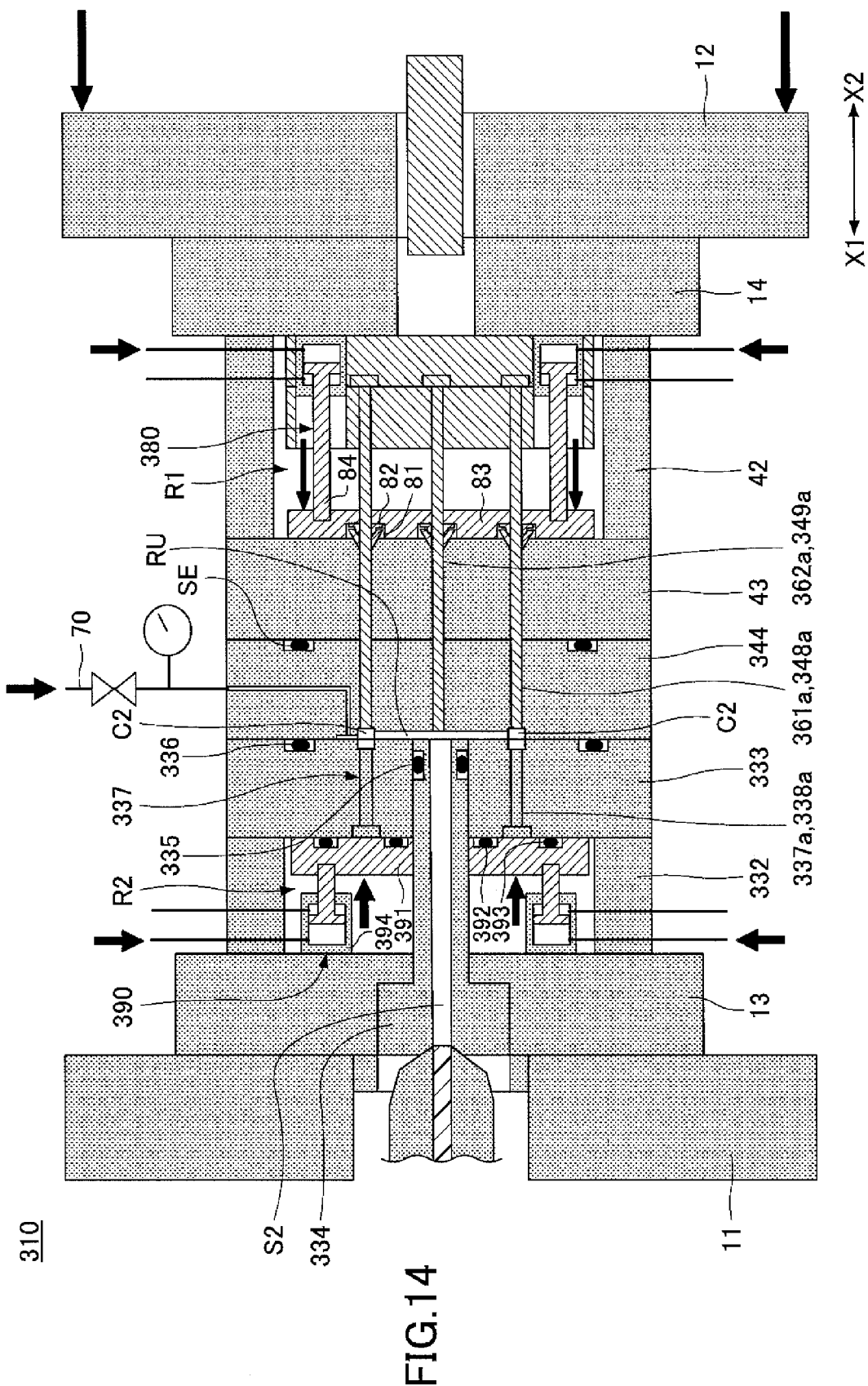
FIG. 14 is another cross-sectional view of the injection molding machine according to the second embodiment of the present invention.
Figure 15:
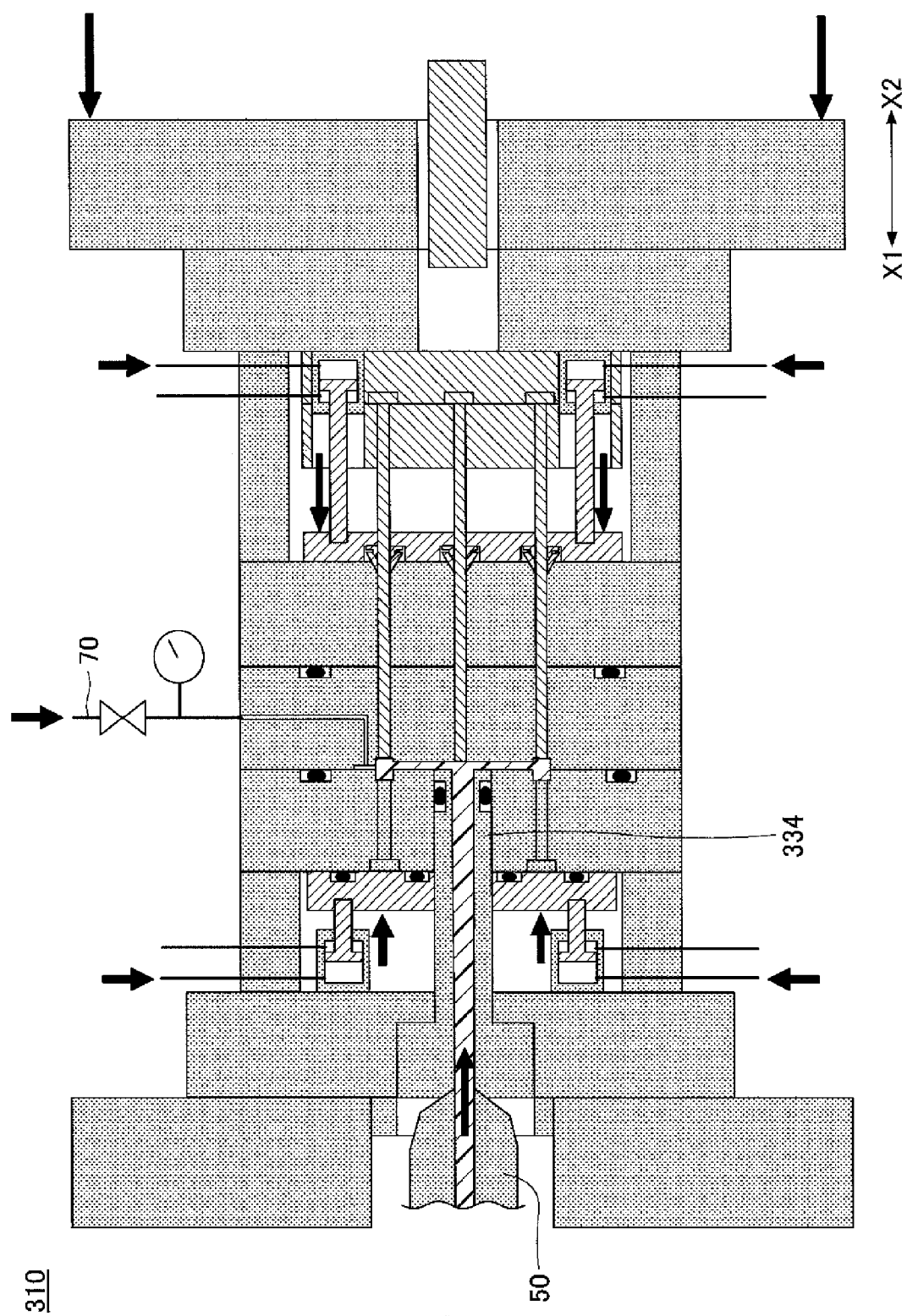
FIG. 15 is another cross-sectional view of the injection molding machine according to the second embodiment of the present invention.
Figure 16:
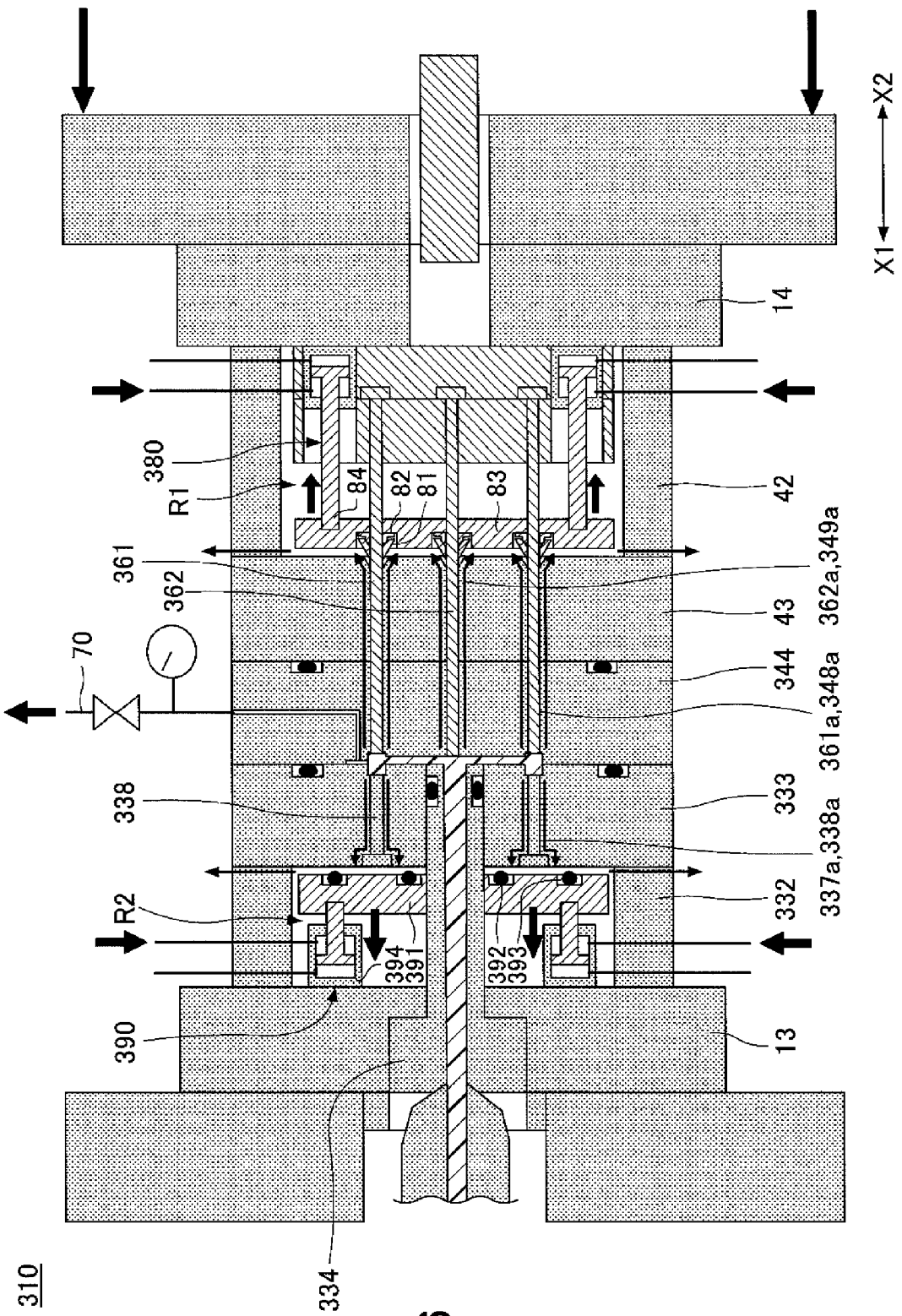
FIG. 16 is another cross-sectional view of the injection molding machine according to the second embodiment of the present invention.
Figure 17:
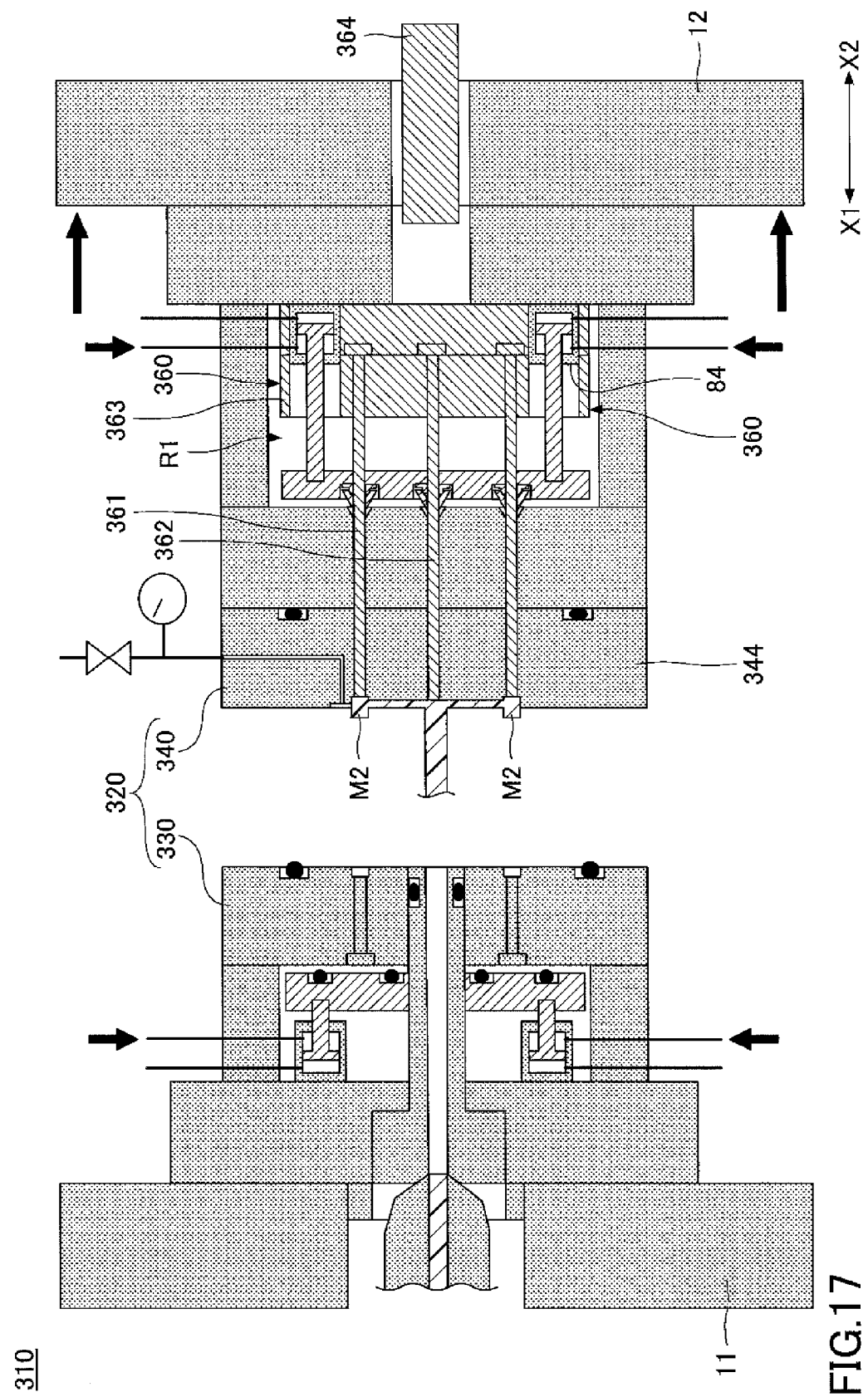
FIG. 17 is another cross-sectional view of the injection molding machine according to the second embodiment of the present invention.
Figure 18:
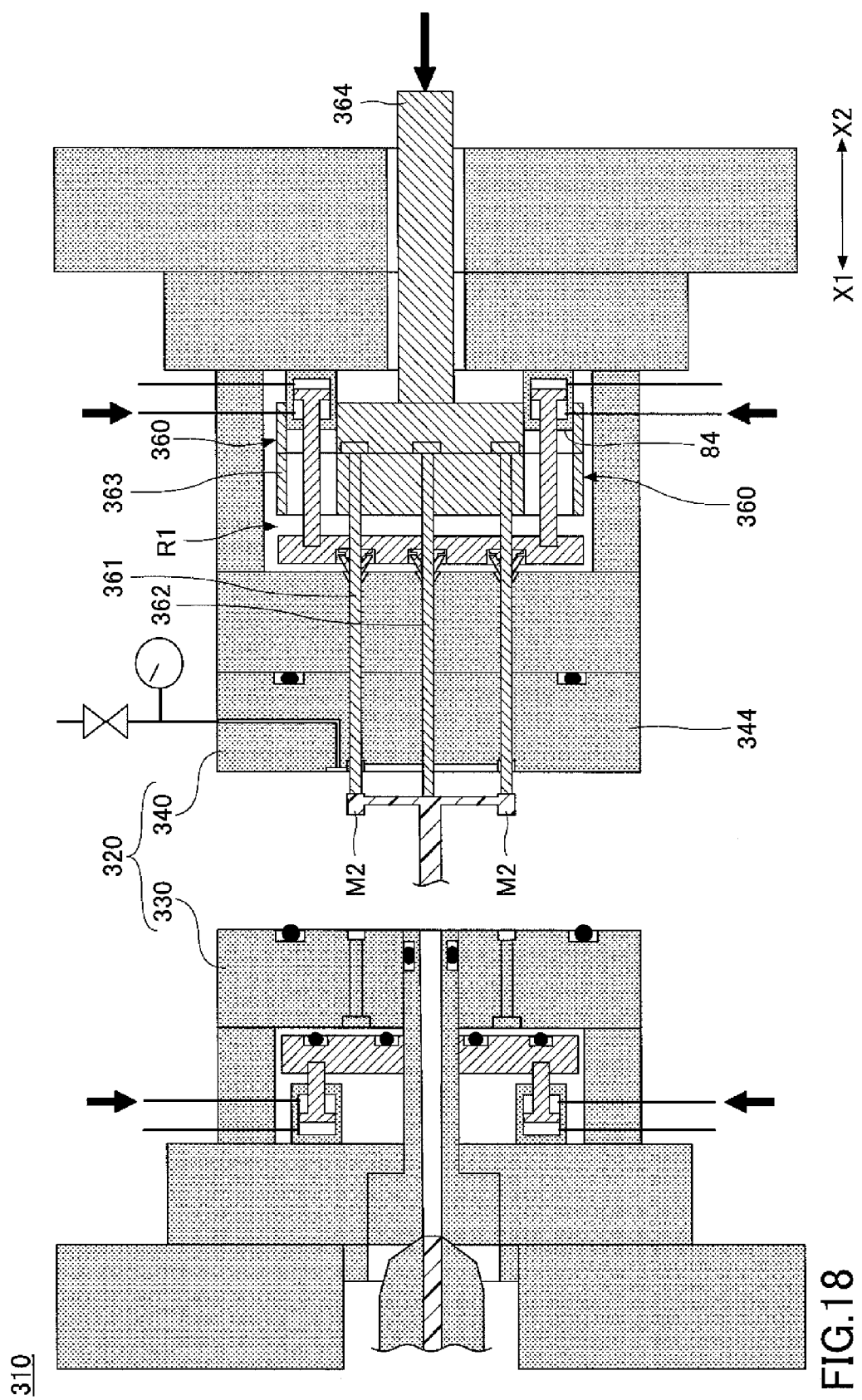
FIG. 18 is another cross-sectional view of the injection molding machine according to the second embodiment of the present invention.
Figure 19:
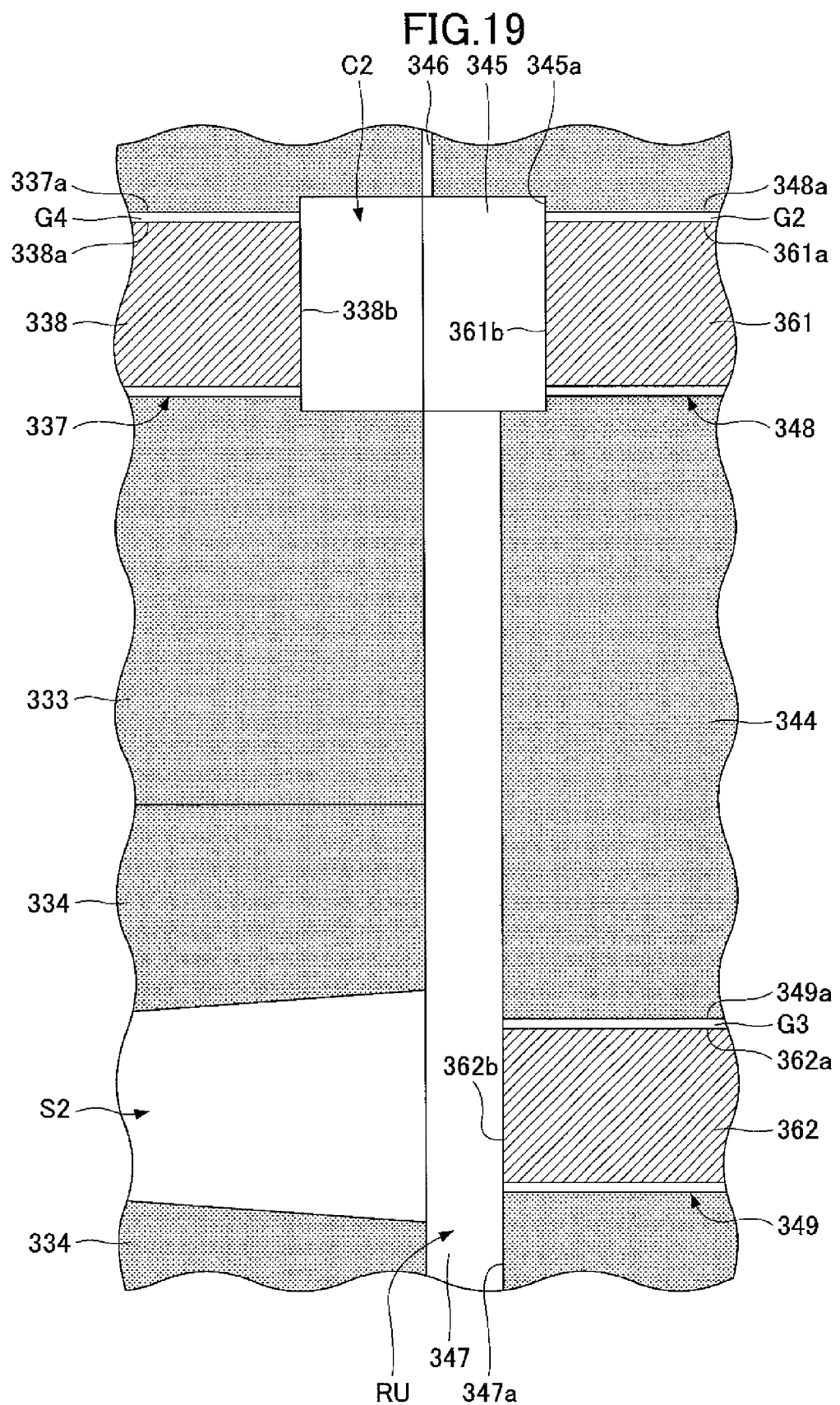
FIG. 19 is an enlarged view of part of the cross-sectional view of FIG. 14.

FIG. 13 through FIG. 18 are cross-sectional views of an injection molding machine 310 according to a second embodiment of the present invention. FIG. 13 is a cross-sectional view of the injection molding machine 310 in a mold closing process. FIG. 14 is a cross-sectional view of the injection molding machine 310 in a gas feeding process after a mold clamping process. FIG. 15 is a cross-sectional view of the injection molding machine 310 in an injection process. FIG. 16 is a cross-sectional view of the injection molding machine 310 in a gas releasing process. FIG. 17 is a cross-sectional view of the injection molding machine 310 in a mold opening process. FIG. 18 is a cross-sectional view of the injection molding machine 310 in a molded article ejecting process. FIG. 19 is an enlarged view of part of the cross-sectional view of FIG. 14.

Referring to FIG. 13, the injection molding machine 310 includes a molding apparatus 320, the injection apparatus 50, an ejector apparatus 360, and the gas feeding and discharging mechanism 70. The injection molding machine 310 further includes a first gas releasing mechanism 380 and a second gas releasing mechanism 390. The injection molding machine 310 further includes gas releasing channels for releasing gas inside cavities C2 (FIG. 14) one on each of the stationary mold 330 side and the movable mold 340 side.

The molding apparatus 320 includes a stationary mold 330 as a first mold and a movable mold 340 as a second mold. The stationary mold 330 is fixed to the stationary platen 11 via the stationary adapter plate 13. The movable mold 340 is attached to the movable platen 12 via the movable adapter plate 14. The movable plate 12 moves forward in the direction indicated by arrow X1 and backward in the direction indicated by arrow X2, so that the molding apparatus 320 is closed (FIG. 13), clamped (FIG. 14), and opened (FIG. 17). The multiple cavities C2 (FIG. 14) are formed between the stationary mold 330 and the movable mold 340 at the time of clamping the molding apparatus 320. The cavities C2 communicate with a sprue S2 via a runner RU (FIG. 14).

As illustrated in FIG. 13, the stationary mold 330 includes, as a unit, a stationary spacer block 332 and a stationary mold plate 333, which are arranged in this order from the stationary adapter plate 13 side. A room (space) R2 surrounded by the stationary spacer block 332 is formed between the stationary adapter plate 13 and the stationary mold plate 333. The room R2 is formed for the below-described operation of a second gas releasing mechanism 390.

A sprue bushing 334 that penetrates through the stationary adapter plate 13 and the stationary mold plate 333 includes the sprue S2 as a feed channel for feeding a foamable resin. The sprue bushing 334 is so fixed to the stationary adapter plate 13 with bolts or the like as to be replaceable when the sprue bushing 334 is degraded.

A seal member 335 (FIG. 14) that seals the gap formed between the sprue bushing 334 and the stationary mold plate 333 is attached to the stationary mold 330. The seal member 335 is annular and is so disposed as to surround the sprue bushing 334.

Likewise, a seal member 336 (FIG. 14) that seals the gap formed between the stationary mold plate 333 and a movable mold plate 344 at the time of clamping the molding apparatus 320 is attached to the stationary mold 330. The seal member 336 is annular and is so disposed as to surround below-described multiple cavity pin holes 337.

As illustrated in FIG. 13, the stationary mold 330 includes multiple cavity pins 338 serving as cores that form part of respective wall surfaces of the cavities C2. The cavity pins 338 are provided one for each of the cavities C2.

The cavity pins 338 are inserted into the corresponding cavity pin holes 337 formed through the stationary mold plate 333. The inside diameter of the cavity pin holes 337 is slightly larger than the outside diameter of the cavity pins 338. The cavity pin holes 337 are formed one for each of the cavity pins 338. The cavity pins 338 are so fixed to the stationary mold plate 333 with bolts or the like as to be replaceable when the cavity pins 338 are degraded.

As illustrated in FIG. 13, the movable mold 340 includes, as a unit, the spacer block 42, the support plate 43, and the movable mold plate 344, which are arranged in this order from the movable adapter plate 14 side. The movable mold plate 344 and the stationary mold plate 333 are caused to come into contact with each other and are clamped, so that the multiple cavities C2 are formed. As illustrated in FIG. 14, the cavities C2 communicate with the sprue S2 via the runner RU.

Multiple recesses (depressed parts) 345 to form part of the cavities C2, a groove part 346 adjacent to one of the recesses 345, and a recess 347 defining the runner RU are formed on the parting surface of the movable mold plate 344, which is a surface to come into contact with the stationary mold plate 333. The groove part 346 is shallower (less in depth) than the recess 345 in order to prevent a foamable resin from entering the groove part 346. The multiple recesses 345 are connected by the recess 347.

Ejector pin holes 348 and 349, into which ejector pins 361 and 362 are movably inserted, respectively, are formed through the movable mold plate 344 and the support plate 43. The inside diameter of the ejector pin holes 348 and 349 is slightly larger than the outside diameter of the ejector pins 361 and 362.

A seal member SE (FIG. 14) that seals the gap formed between the movable mold plate 344 and the support plate 43 is attached to the movable mold 340. The seal member SE is annular and is so disposed as to surround the ejector pin holes 348 and 349.

As illustrated in FIG. 18, the ejector apparatus 360 pushes out multiple molded articles M2, molded inside the multiple cavities C2, and the resin solidified in the runner RU from the movable mold plate 344 after the molding apparatus 320 is opened. The ejector apparatus 360 includes the ejector pins 361 and 362, an ejector plate 363, and an ejector rod 364. The ejector pins 361 and 362 are movable relative to the movable mold plate 344. The ejector pins 361 and 362 and the ejector plate 363 are movable as a unit. The ejector rod 3634 pushes the ejector plate 363 from its rear side.

The ejector plate 363 is disposed inside the room R1, and is so supported by the hydro pneumatic cylinders 84 as to be movable in the directions indicated by arrows X1 and X2. The ejector plate 363 is urged in the backward direction (the direction indicated by arrow X2) by an urging member such as a spring.

As illustrated in FIG. 18, as the ejector rod 364 moves forward, the ejector plate 363 is pushed from the rear side to move forward in the direction indicated by arrow X1 against the urging force of the spring. As a result, the ejector pins 361 are caused to move forward relative to the movable mold plate 344 to push the molded articles M2, molded inside the cavities C2, out of the movable mold plate 344. Likewise, the ejector pin 362 pushes the resin solidified in the runner RU out of the movable mold plate 344.

Thereafter, as illustrated in FIG. 13, as the ejector rod 364 moves backward, the ejector plate 363 is caused to move backward in the direction indicated by arrow X2 by the urging force of the spring to come into contact with the movable adapter plate 14 and stop. At this point, respective end faces 361b (FIG. 19) of the ejector pins 361 are substantially in the same plane as inside bottom surfaces 345a (FIG. 19) of the recesses 345 to form part of wall surfaces of the cavities C2 at the time of mold clamping. On the other hand, an end face 362b (FIG. 19) of the ejector pin 362 is substantially in the same plane as an inside bottom surface 347a (FIG. 19) of the recess 347 to form part of a wall surface of the runner RU at the time of mold clamping.

As illustrated in FIG. 16, the first gas releasing mechanism 380 and the second gas releasing mechanism 390 release the gas inside the cavities C2 to the atmosphere using a pressure difference during or after the injection of the foamable resin by the injection apparatus 50. At this point, the foamable resin is foamed, so that the molded articles M2 (FIG. 18) are obtained that are substantially free of foaming marks on their surfaces and are foamed inside.

The gas feeding and discharging mechanism 70 may also release the gas inside the cavities C2 to the atmosphere using a pressure difference in combination with the first and second gas releasing mechanisms 380 and 390. This increases the degassing (gas releasing) rate, so that generation of minute irregularities due to residual gas is prevented and the molded articles M2 are obtained with good quality of appearance.

As illustrated in FIG. 16, the first gas releasing mechanism 380 releases the gas inside the cavities C2 to the atmosphere using a pressure difference through gaps G2 and a gap G3 (FIG. 19). Referring to FIG. 19, the gaps G2 are formed one between an inner wall surface 348a of each ejector pin hole 348 and an outer circumferential (peripheral) surface 361a of the corresponding ejector pin 361. The gap G3 is formed between an inner wall surface 349a of the ejector pin hole 349 and an outer circumferential (peripheral) surface 362a of the corresponding ejector pin 362. The gas inside the cavities C2 passes through the gaps G2 and G3 to be released to the room R1, and is thereafter released to the atmosphere through a gap formed between the support plate 43 and the spacer block 42 surrounding the room R1.

Thus, like in the first embodiment, in this embodiment as well, the existing gaps G2 and G3, which have been formed for other purposes, are used as a gas releasing channel. Therefore, it is possible to simplify the configuration of the molding apparatus 320. This makes it easy to design the molding apparatus 320, so that it is possible to reduce the cost of the molding apparatus 320. Further, it is possible to reduce the molding apparatus 320 in size.

Further, according to this embodiment, the end faces 361b of the ejector pins 361 forming a gas releasing channel form part of wall surfaces of the cavities C2. This allows the gas inside the cavities C2 to be swiftly released to the atmosphere.

The first gas releasing mechanism 380 includes an opening and closing mechanism configured to open and close a gas releasing channel including the gaps G2 and G3 (FIG. 19). As illustrated in FIG. 16, this opening and closing mechanism includes the first ferrules 81, the second ferrules 82, the seal plate 83, and the hydro pneumatic cylinders 84.

The first ferrules 81 and the second ferrules 82 are annular, and have respective holes for inserting the corresponding ejector pins 361 and 362 formed in their respective center portions. The inside diameter of the first ferrules 81 and the second ferrules 82 is slightly larger than the outside diameter of the ejector pins 361 and 362. The first ferrules 81 are provided one for each of the ejector pins 361 and 362. The second ferrules 82 are provided one for each of the ejector pins 361 and 362.

The seal plate 83 is so disposed inside the room R1 as to be movable in the directions indicated by arrows X1 and X2. The insertion holes 83a (FIG. 7) into which the ejector pins 361 and 362 are movably inserted are formed through the seal plate 83.

According to this opening and closing mechanism, with the extension and retraction of the hydro pneumatic cylinders 84, the seal plate 83 and the first and second ferrules 81 and 82 are caused to move forward and backward in the directions indicated by arrows X1 and X2 to move toward and away from the support plate 43. Accordingly, like in the first embodiment, the gas releasing channel including the gaps G2 and G3 is opened and closed.

As illustrated in FIG. 16, the second gas releasing mechanism 390 releases the gas inside the cavities C2 to the atmosphere using a pressure difference through gaps G4 (FIG. 19). Referring to FIG. 19, the gaps G4 are formed between inner wall surfaces 337a of the cavity pin holes 337 and outer circumferential (peripheral) surfaces 338a of the corresponding cavity pins 338. The gas inside the cavities C2 passes through the gaps G4 to be released to the room R2, and is thereafter released to the atmosphere through a gap formed between the stationary mold plate 333 and the stationary spacer block 332 surrounding the room R2.

Thus, according to this embodiment, the gas releasing channels are provided one on each of the movable mold 340 side and the stationary mold 330 side. This increases the degassing (gas releasing) rate.

Further, according to this embodiment, rear end faces 338b (FIG. 19) of the cavity pins 338 forming a gas releasing channel form part of wall surfaces of the cavities C2. This allows the gas inside the cavities C2 to be swiftly released to the atmosphere.

The second gas releasing mechanism 390 includes an opening and closing mechanism configured to open and close a gas releasing channel including the gaps G4 (FIG. 19). As illustrated in FIG. 16, this opening and closing mechanism includes a seal plate 391, seal members 392 and 393, and hydro pneumatic cylinders 394.

The seal plate 391 is so disposed inside the room R2 as to be movable in the directions indicated by arrows X1 and X2. An insertion hole 391a into which the sprue bushing 334 is movably inserted is formed through the seal plate 391.

The seal member 392 is annular. The seal member 392 is so disposed as to surround the sprue bushing 334 and to be positioned inside the cavity pins 338 (in a plan view in the direction indicated by arrow X2). The seal member 393 is annular and is so disposed as to surround the cavity pins 338 (in a plan view in the direction indicated by arrow X2).

The seal members 392 and 393 are fixed to the seal plate 391 (or the stationary mold plate 333). The seal plate 391 and the stationary mold plate 333 come into and out of contact with each other through the seal members 392 and 393, so that the gas releasing channel including the gaps G4 is closed and opened.

The hydro pneumatic cylinders 394 are connected to the stationary adapter plate 13 at their respective front end portions, and are connected to the seal plate 391 at their respective rear end portions. The extension and retraction of the hydro pneumatic cylinders 394 cause the seal plate 391 to move backward and forward.

As illustrated in FIG. 14, the extension of the hydro pneumatic cylinders 394 causes the seal plate 391 to move backward in the direction indicated by arrow X2 to come into contact with the stationary mold plate 333 through the seal members 392 and 393. As a result, the gas releasing channel including the gaps G4 is closed.

As illustrated in FIG. 16, the retraction of the hydro pneumatic cylinders 394 causes the seal plate 391 to move forward in the direction indicated by arrow X1 so that the seal members 392 and 393 are separated from the stationary mold plate 333. As a result, the gas releasing channel including the gaps G4 is opened.

The operation (the injection molding method) of the injection molding machine 310 of this embodiment is the same as that of the injection molding machine 10 of the first embodiment, and accordingly, a description thereof is omitted.

The injection molding machine 310 according to this embodiment includes the first and second gas releasing mechanisms 380 and 390. However, the injection molding machine 310 may also be configured to include one of the first and second gas releasing mechanisms 380 and 390.

Third Embodiment

Figure 20:
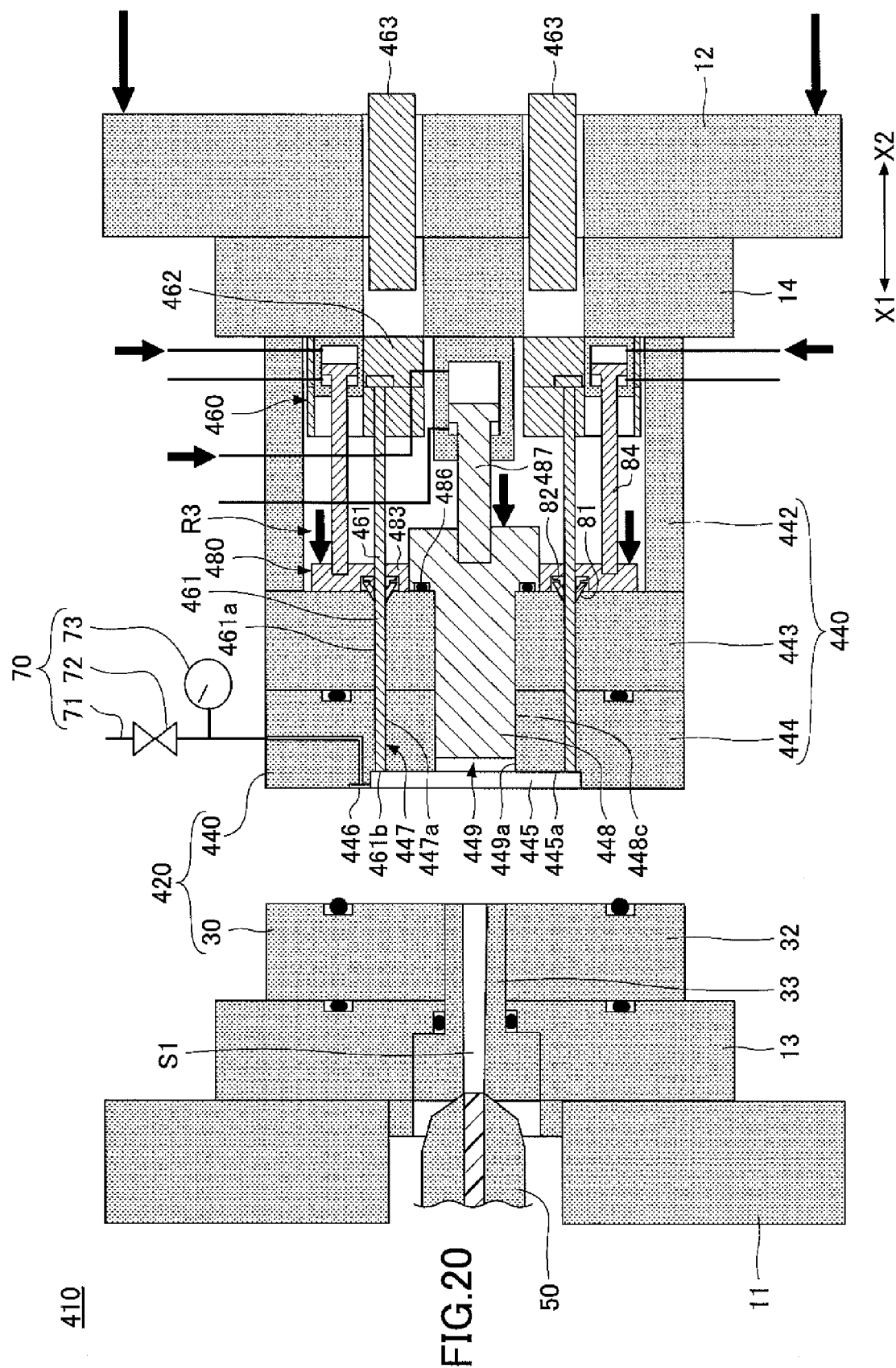
FIG. 20 is a cross-sectional view of an injection molding machine according to a third embodiment of the present invention.
Figure 21:
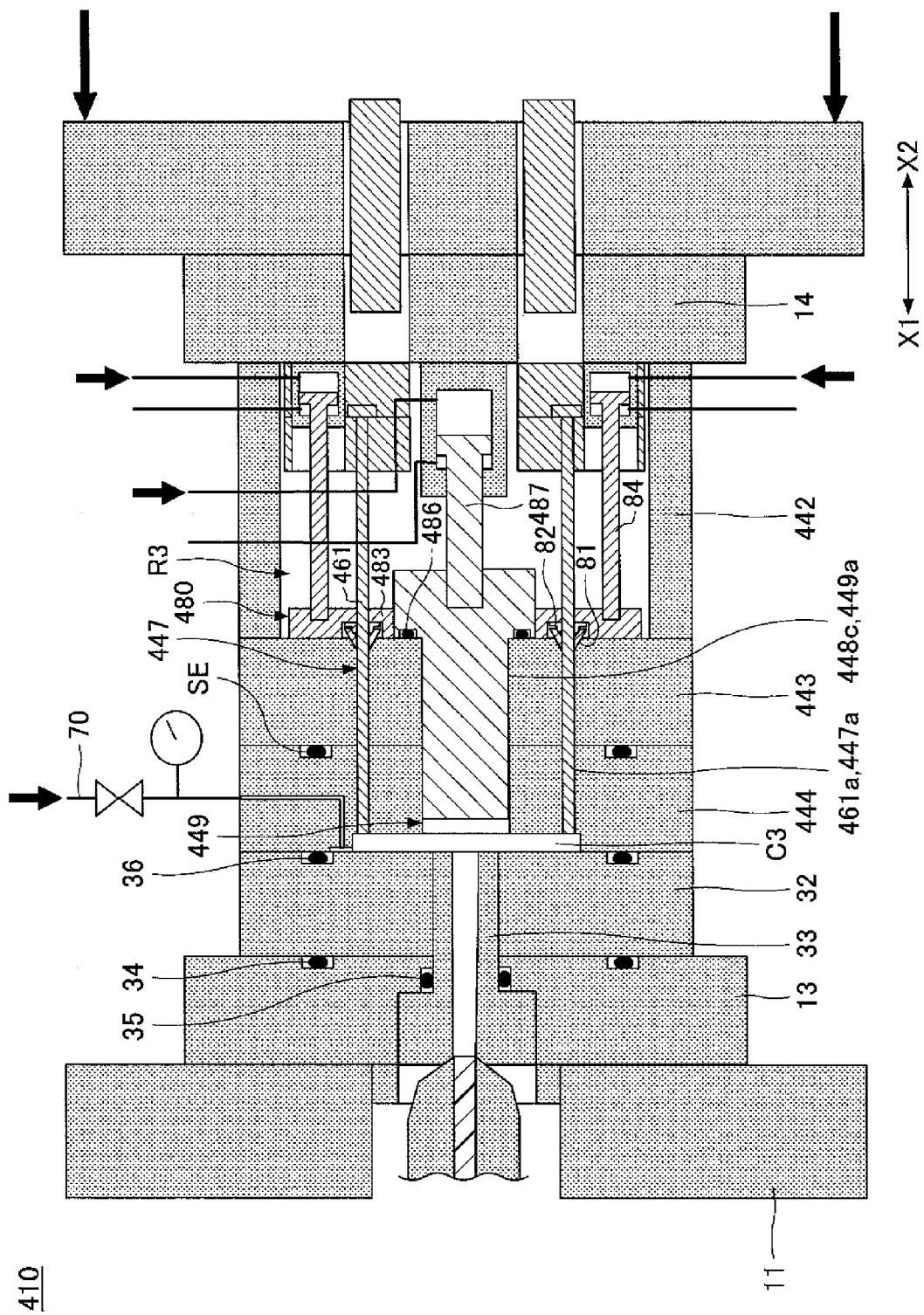
FIG. 21 is another cross-sectional view of the injection molding machine according to the third embodiment of the present invention.
Figure 22:
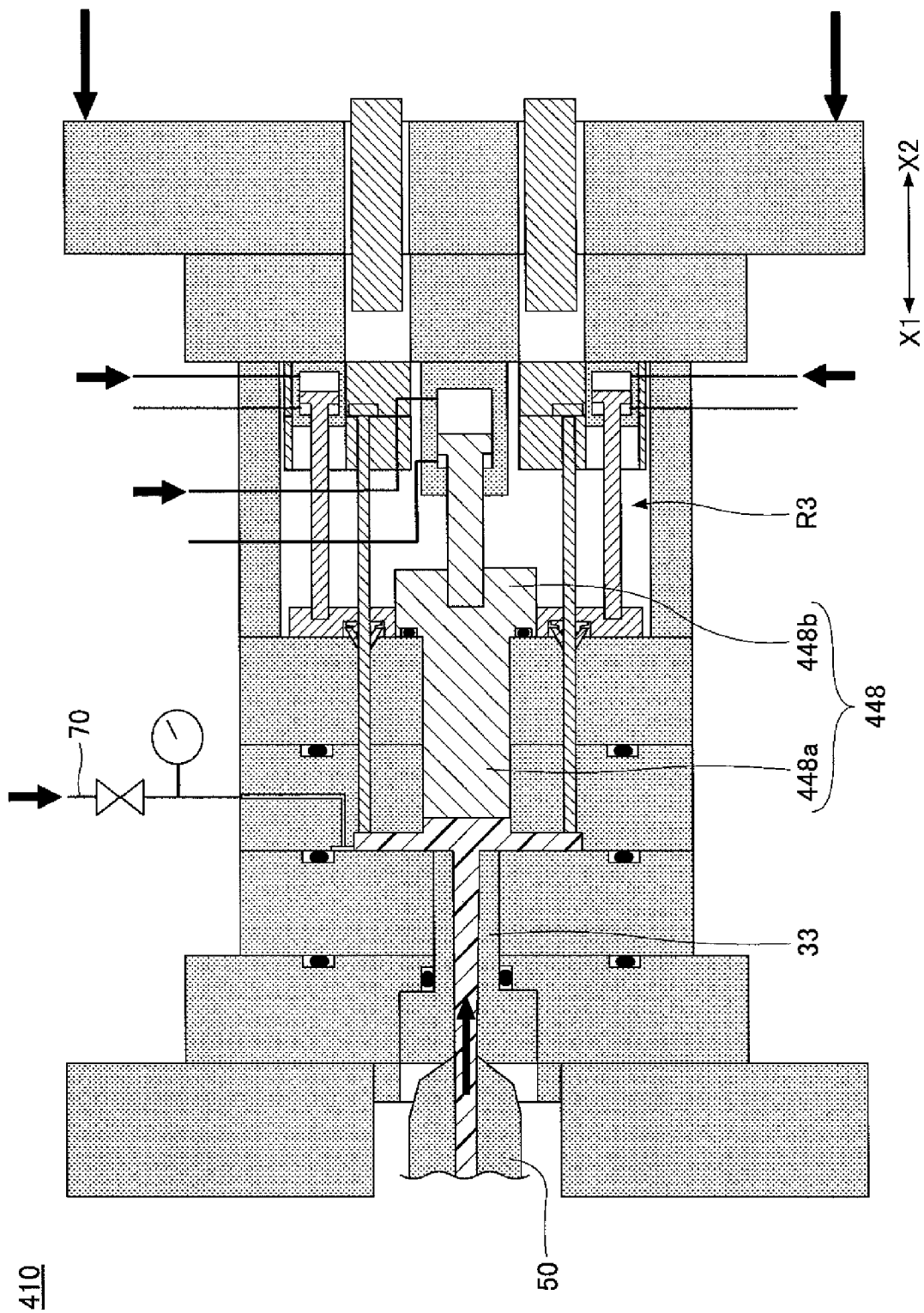
FIG. 22 is another cross-sectional view of the injection molding machine according to the third embodiment of the present invention.
Figure 23:
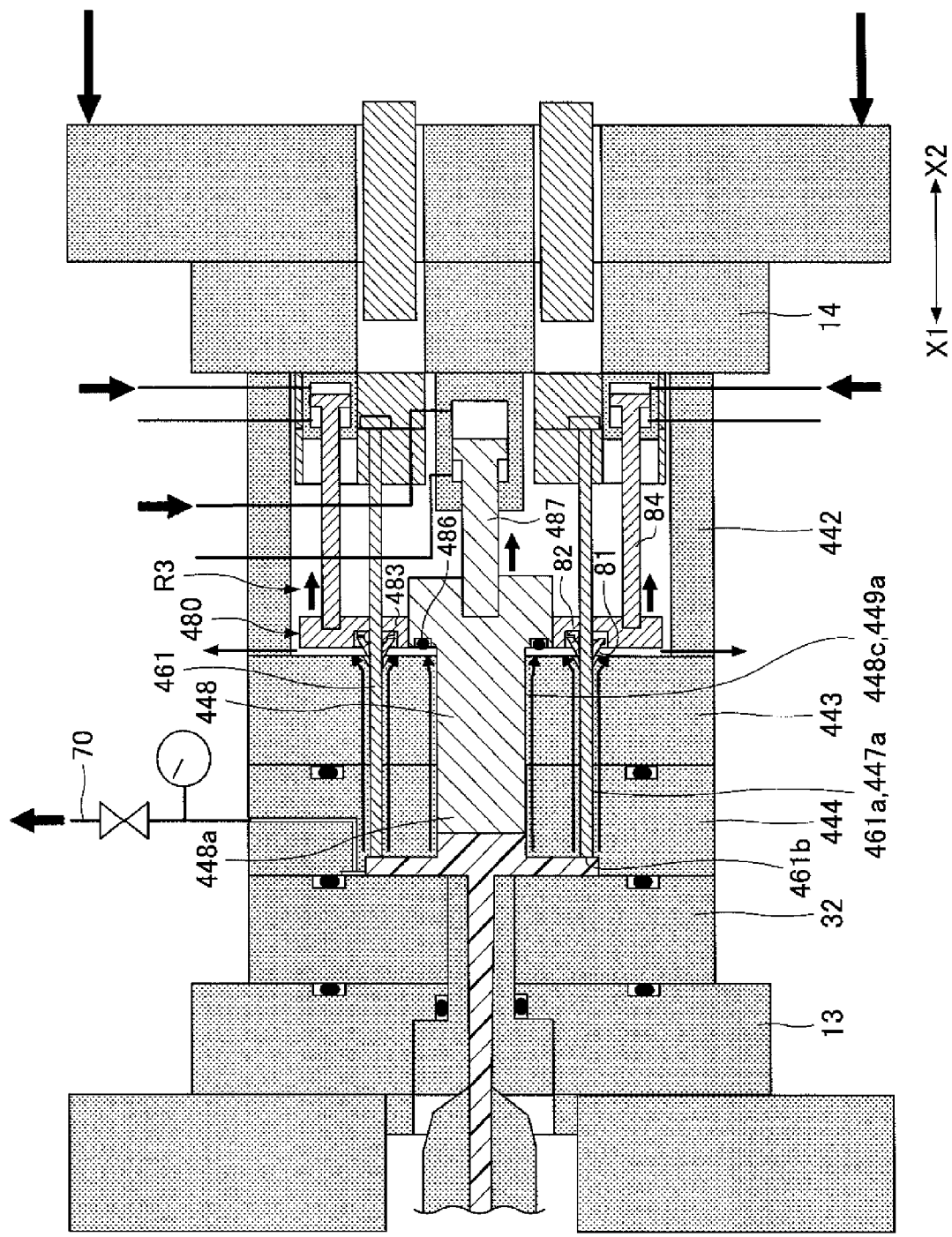
FIG. 23 is another cross-sectional view of the injection molding machine according to the third embodiment of the present invention.
Figure 24:
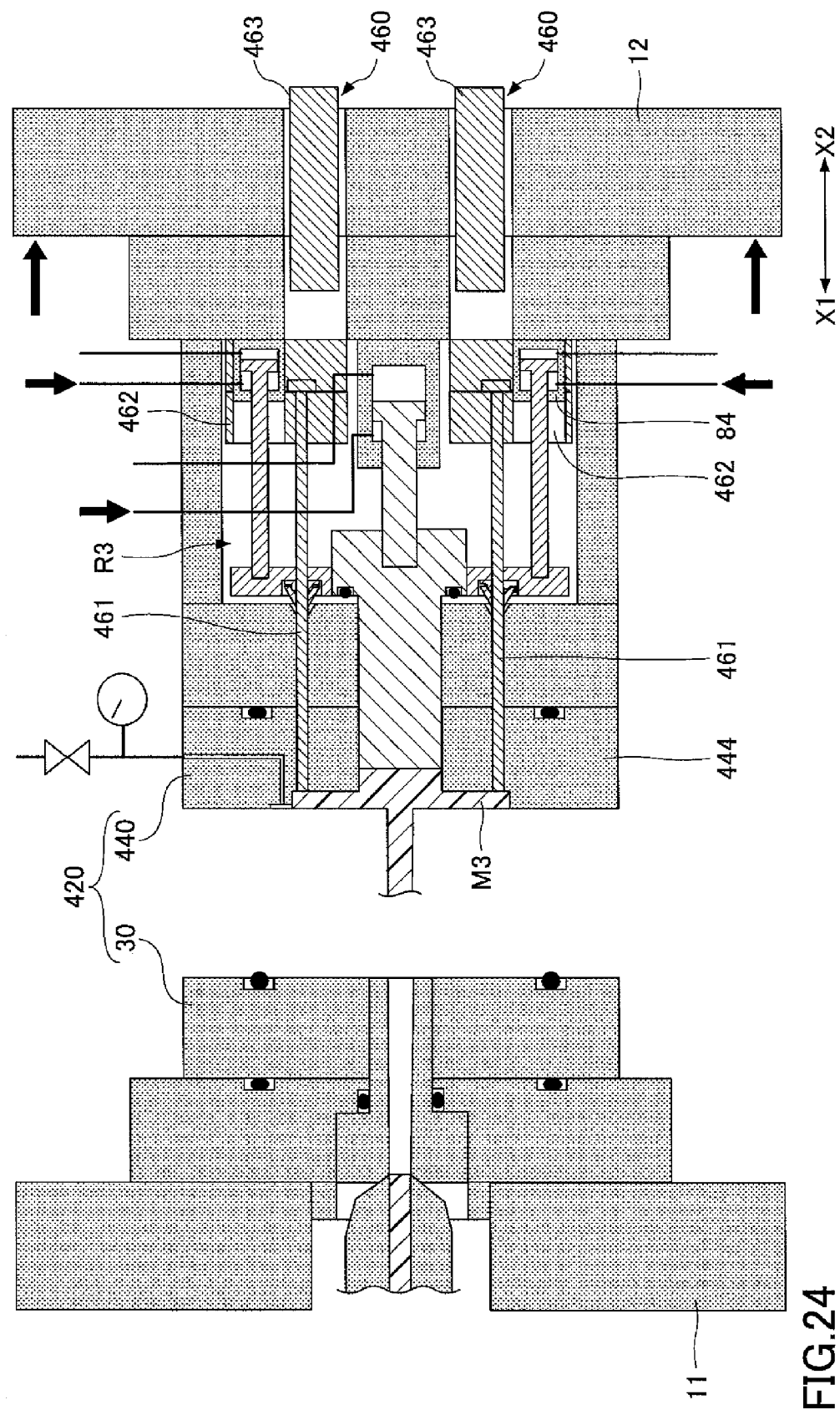
FIG. 24 is another cross-sectional view of the injection molding machine according to the third embodiment of the present invention.
Figure 25:
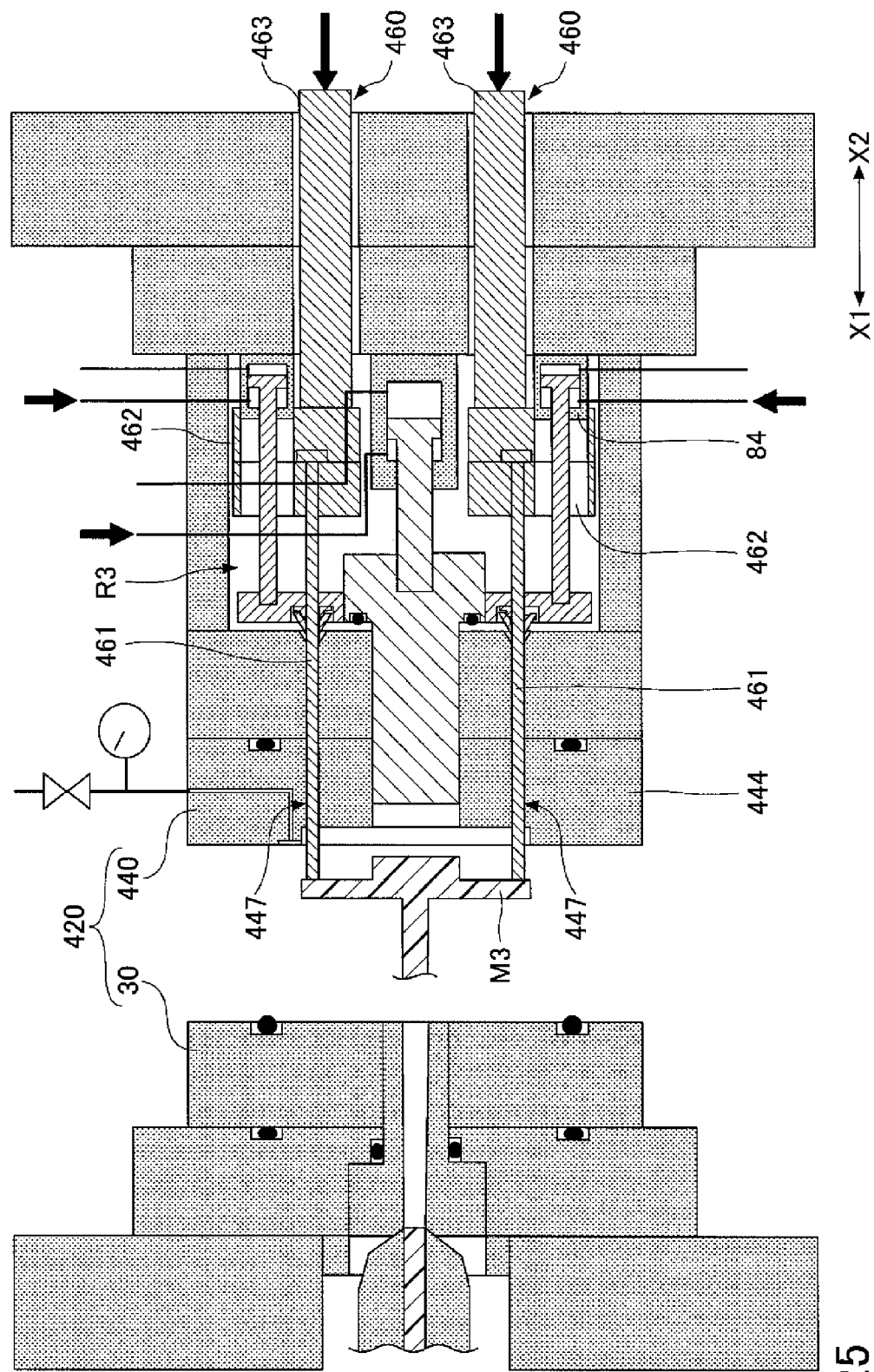
FIG. 25 is another cross-sectional view of the injection molding machine according to the third embodiment of the present invention.
Figure 26:
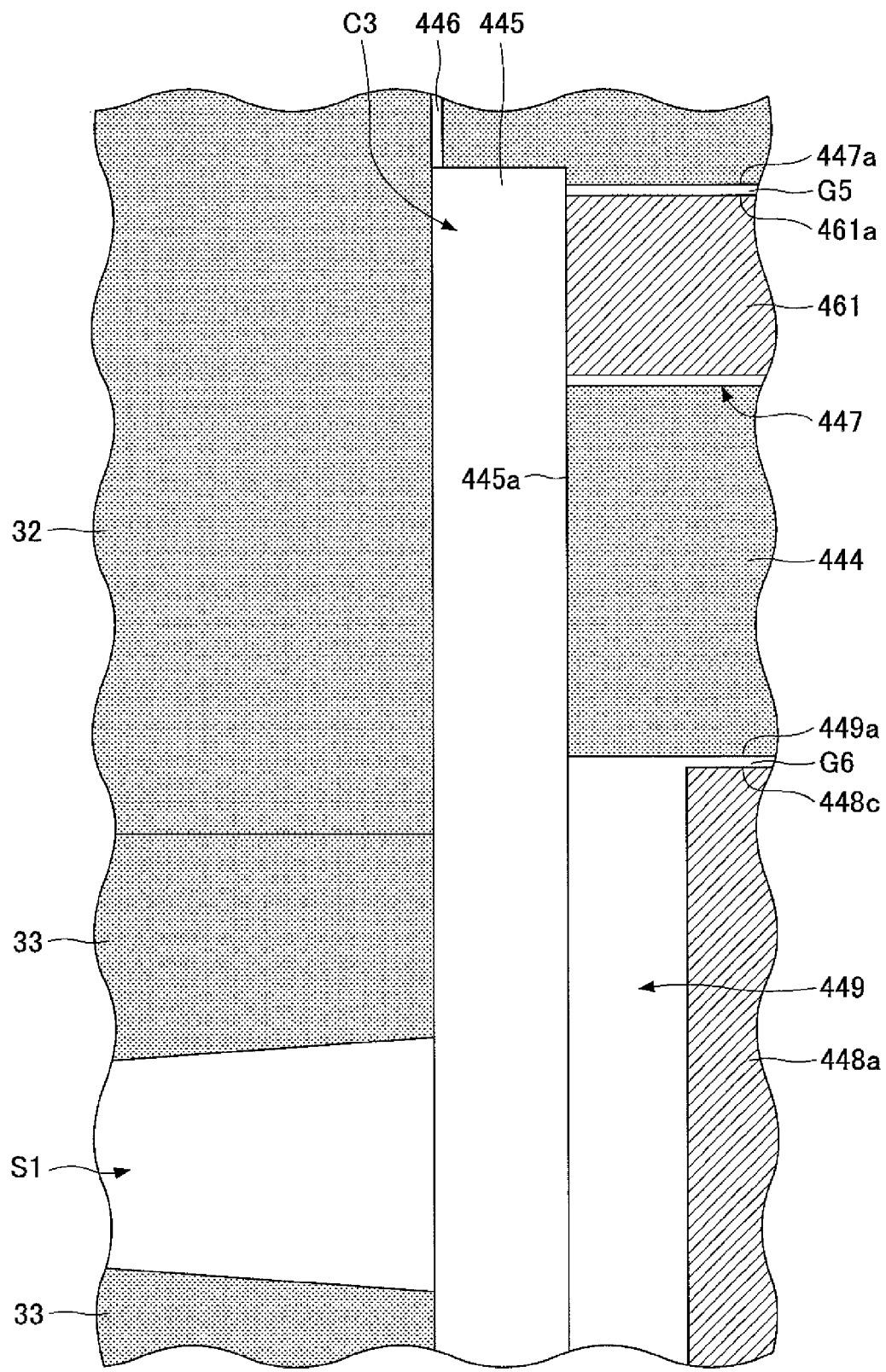
FIG. 26 is an enlarged view of part of the cross-sectional view of FIG. 21.

FIG. 20 through FIG. 25 are cross-sectional views of an injection molding machine 410 according to a third embodiment of the present invention. FIG. 20 is a cross-sectional view of the injection molding machine 410 in a mold closing process. FIG. 21 is a cross-sectional view of the injection molding machine 410 in a gas feeding process after a mold clamping process. FIG. 22 is a cross-sectional view of the injection molding machine 410 in an injection process. FIG. 23 is a cross-sectional view of the injection molding machine 410 in a gas releasing process. FIG. 24 is a cross-sectional view of the injection molding machine 410 in a mold opening process. FIG. 25 is a cross-sectional view of the injection molding machine 410 in a molded article ejecting process. FIG. 26 is an enlarged view of part of the cross-sectional view of FIG. 21.

Referring to FIG. 20, the injection molding machine 410 includes a molding apparatus 420, the injection apparatus 50, ejector apparatuses 460, the gas feeding and discharging mechanism 70, and a gas releasing mechanism 480. The gas releasing mechanism 480 of this embodiment is configured to change the volume of a cavity C3 (FIG. 21) inside the molding apparatus 420.

The molding apparatus 420 includes the stationary mold 30 as a first mold and a movable mold 440 as a second mold. The stationary mold 30 is fixed to the stationary platen 11 via the stationary adapter plate 13. The movable mold 440 is attached to the movable platen 12 via the movable adapter plate 14. The movable plate 12 moves forward in the direction indicated by arrow X1 and backward in the direction indicated by arrow X2, so that the molding apparatus 420 is closed (FIG. 20), clamped (FIG. 21), and opened (FIG. 24).

As illustrated in FIG. 20, the movable mold 440 includes, as a unit, a spacer block 442, a support plate 443, and a movable mold plate 444, which are arranged in this order from the movable adapter plate 14 side. The movable mold plate 444 and the stationary mold plate 32 are caused to come into contact and are clamped, so that the cavity C3 is formed.

A recess (depressed part) 445 to form part of the cavity C3 and a groove part 446 are adjacently formed on the parting surface of the movable mold plate 444, which is a surface to come into contact with the stationary mold plate 32. The groove part 446 is shallower (less in depth) than the recess 445 in order to prevent a foamable resin from entering the groove part 446.

A room (space) R3 surrounded by the spacer block 442 is formed between the movable adapter plate 14 and the support plate 443. The room R3 is formed for the below-described operations of the ejector apparatuses 460 and the gas releasing mechanism 480.

One or more ejector pin holes 447, into which one or more ejector pins 461 are movably inserted, are formed through the movable mold plate 444 and the support plate 443. The inside diameter of the ejector pin holes 447 is slightly larger than the outside diameter of the ejector pins 461.

The movable mold 440 includes a slide core 448 that changes the volume of the cavity C3. The slide core 448 includes a body part 448a (FIG. 22) and a head part 448b (FIG. 22) as a unit. The body part 448a is movably inserted into a guide hole 449 formed through the movable mold plate 444 and the support plate 443. The head part 448b is larger in size than the guide hole 449. The head part 448b is disposed outside the guide hole 449, for example, in the room R3.

The seal member SE (FIG. 21) that seals the gap formed between the movable mold plate 444 and the support plate 443 is attached to the movable mold 440. The seal member SE is annular and is so disposed as to surround the ejector pin holes 447 and the guide hole 449.

As illustrated in FIG. 25, the ejector apparatuses 460 push out a molded article M3, molded inside the cavity C3, from the movable mold plate 444 after the molding apparatus 420 is opened. The ejector apparatuses 460 are provided one for each of the ejector pin holes 447.

Each of the ejector apparatuses 460 includes the ejector pin 461, an ejector plate 462, and an ejector rod 463. The ejector pin 461 is movable relative to the movable mold plate 444. The ejector pin 461 and the ejector plate 462 are movable as a unit. The ejector rod 463 pushes the ejector plate 462 from its rear side.

The ejector plates 462 are disposed inside the room R3, and are so supported by the corresponding hydro pneumatic cylinders 84 as to be movable in the directions indicated by arrows X1 and X2. The ejector plates 462 are urged in the backward direction (the direction indicated by arrow X2) by respective urging members such as springs.

As illustrated in FIG. 25, as the ejector rods 463 move forward, the ejector plates 462 are pushed from their respective rear sides to move forward in the direction indicated by arrow X1 against the urging forces of the springs. As a result, the ejector pins 461 are caused to move forward relative to the movable mold plate 444 to push the molded article M3 out of the movable mold plate 444.

Thereafter, as illustrated in FIG. 20, as the ejector rods 463 move backward, the ejector plates 462 are caused to move backward in the direction indicated by arrow X2 by the urging forces of the springs to come into contact with the movable adapter plate 14 and stop. At this point, respective end faces 461b of the ejector pins 461 are substantially in the same plane as an inside bottom surface 445a of the recess 445 to form part of a wall surface of the cavity C3 at the time of mold clamping.

The gas releasing mechanism 480 releases the gas inside the cavity C3 to the atmosphere during or after the injection of the foamable resin by the injection apparatus 50. At this point, the foamable resin is foamed, so that the molded article M3 (FIG. 24) is obtained that is substantially free of foaming marks on the surface and is foamed inside.

The gas feeding and discharging mechanism 70 may also release the gas inside the cavity C3 to the atmosphere using a pressure difference in combination with the gas releasing mechanism 480. This increases the degassing (gas releasing) rate, so that generation of minute irregularities due to residual gas is prevented and the molded article M3 is obtained with good quality of appearance.

As illustrated in FIG. 23, the gas releasing mechanism 480 releases the gas inside the cavity C3 to the atmosphere using a pressure difference through gaps G5 and a gap G6 (FIG. 26). Referring to FIG. 26, the gaps G5 are formed between inner wall surfaces 447a of the ejector pin holes 447 and outer circumferential (peripheral) surfaces 461a of the corresponding ejector pins 461. The gap G6 is formed between an inner wall surface 449a of the guide hole 449 and an outer circumferential (peripheral) surface 448c of the body part 448a of the slide core 448. The gas inside the cavity C3 passes through the gaps G5 and G6 to be released to the room R3, and is thereafter released to the atmosphere through a gap formed between the support plate 443 and the spacer block 442 surrounding the room R3.

Thus, like in the first embodiment, in this embodiment as well, the existing gaps G5 and G6, which have been formed for other purposes, are used as a gas releasing channel. Therefore, it is possible to simplify the configuration of the molding apparatus 420. This makes it easy to design the molding apparatus 420, so that it is possible to reduce the cost of the molding apparatus 420. Further, it is possible to reduce the molding apparatus 420 in size.

Further, according to this embodiment, the end faces 461b of the ejector pins 461 forming a gas releasing channel form part of a wall surface of the cavity C3. This allows the gas inside the cavity C3 to be swiftly released to the atmosphere.

Likewise, the body part 448a of the slide core 448 forming a gas releasing channel forms part of a wall surface of the cavity C3. This allows the gas inside the cavity C3 to be swiftly released to the atmosphere.

The gas releasing mechanism 480 includes an opening and closing mechanism configured to open and close a gas releasing channel including the gaps G5 (FIG. 26). As illustrated in FIG. 23, the opening and closing mechanism includes the first and second ferrules 81 and 82, a seal plate 483, and the hydro pneumatic cylinders 84.

The first and second ferrules 81 and 82 are annular, and have respective holes for inserting the corresponding ejector pins 461 formed in their respective center portions. The inside diameter of the first and second ferrules 81 and 82 is slightly larger than the outside diameter of the ejector pins 461. The first ferrules 81 are provided one for each of the ejector pins 461. The second ferrules 82 are provided one for each of the ejector pins 461.

Insertion holes into which the ejector pins 461 are movably inserted and an insertion hole into which the head part 448b (FIG. 22) of the slide core 448 is inserted are formed through the seal plate 483.

According to this opening and closing mechanism, with the extension and retraction of the hydro pneumatic cylinders 84, the seal plate 483 and the first and second ferrules 81 and 82 are caused to move forward and backward in the directions indicated by arrows X1 and X2 to move toward and away from the support plate 443. Accordingly, like in the first embodiment, the gas releasing channel including the gaps G5 is opened and closed.

Further, the gas releasing mechanism 480 includes an opening and closing mechanism configured to open and close a gas releasing channel including the gap G6 (FIG. 26). As illustrated in FIG. 23, this opening and closing mechanism includes a seal member 486 and a hydro pneumatic cylinder 487.

The seal member 486 is annular. The seal member 486 is so disposed as to surround the body part 448a of the slide core 448, and is fixed to the head part 448b (or the support plate 443).

The support plate 443 and the head part 448b come into and out of contact with each other through the seal member 486, so that the gas releasing channel including the gap G6 is closed and opened.

The hydro pneumatic cylinder 487 is connected to the movable adapter plate 14 at its rear end portion, and is connected to the head part 448b at its front end portion. The extension and retraction of the hydro pneumatic cylinder 487 cause the head part 448b to move forward and backward.

As illustrated in FIG. 21, the extension of the hydro pneumatic cylinder 487 causes the head part 448b to move forward in the direction indicated by arrow X1 to come into contact with the support plate 443 through the seal member 486. As a result, the gas releasing channel including the gap G6 is closed.

As illustrated in FIG. 23, the retraction of the hydra pneumatic cylinder 487 causes the head part 448b to move backward in the direction indicated by arrow X2 so that the seal member 486 is separated from the support plate 443. As a result, the gas releasing channel including the gap G6 is opened.

At this point, the volume of the cavity C3 increases to cause the foamable resin to expand. Therefore, it is possible to further reduce the weight of the molded article M3.

The operation (the injection molding method) of the injection molding machine 410 of this embodiment is the same as that of the injection molding machine 10 of the first embodiment, and accordingly, a description thereof is omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the first through third embodiments including variations according to the present invention have been described in detail, it should be understood that various changes, substitutions, and alterations could be made hereto without departing from the spirit and scope of the invention.

For example, the above-described gas feeding and discharging mechanism 70 is configured to feed gas to and discharge gas from the cavities C1 through C3. However, the gas feeding and discharging mechanism 70 may also be configured to have the function of feeding gas to the cavities C1 through C3 without the function of discharging gas from the cavities C1 through C3.

Further, the above-described movable molds 40, 340, and 440 include the support plate 43 or 443 that reinforces the movable mold plate 44, 344, or 444. However, the support plate 43 or 443 may be omitted. If the support plate 43 or 443 is omitted, the gas releasing mechanisms 80, 180, 280, 380 and 480 may open and close a gas releasing channel by causing the seal plate 83, 181 or 483 to move toward and away from the movable mold plate 44, 344 or 444 instead of the support plate 43 or 443.

The driving source that causes the seal plates 83, 181, 391 and 483 to move is not limited to a hydro pneumatic cylinder as described above, and may be, for example, a ball screw mechanism.

What is claimed is:

1. An injection molding machine, comprising:
   a gas feeding mechanism configured to feed gas to a cavity formed between a first mold plate and a second mold plate in a clamped state;
   an injection apparatus configured to inject a foamable resin into the cavity having an inside pressure thereof increased to be higher than an atmospheric pressure by the gas feeding mechanism; and
   a gas releasing mechanism configured to release the gas inside the cavity to an atmosphere through a gap formed between an inner wall surface of a through hole formed through one of the first mold plate and the second mold plate and an outer circumferential surface of a mold member inserted into the through hole, during or after the injection of the foamable resin by the injection apparatus, the gas releasing mechanism including an opening and closing mechanism configured to open and close the gap,
   wherein the opening and closing mechanism includes:
      a hydro pneumatic cylinder configured to extend and retract relative to the one of the first mold plate and the second mold plate;
      a seal plate connected to the hydro pneumatic cylinder; and
      a sealing member provided between the seal plate and the one of the first mold plate and the second mold plate,
      wherein the sealing member moves toward the one of the first mold plate and the second mold plate to close the gap when the retracted hydro pneumatic cylinder extends to move the seal plate toward the one of the first mold plate and the second mold plate, and the sealing member moves away from the one of the first mold plate and the second mold plate to open the gap when the extended hydro pneumatic cylinder retracts to move the seal plate away from the one of the first mold plate and the second mold plate.

2. The injection molding machine as claimed in claim 1, wherein the mold member forms a part of a wall surface of the cavity.

3. The injection molding machine as claimed in claim 2, wherein the mold member comprises an ejector pin movably inserted into the through hole and is configured to push an article molded inside the cavity out of the one of the first mold plate and the second mold plate.

4. The injection molding machine as claimed in claim 2, wherein the mold member comprises a core fixed relative to the through hole and forming the part of the wall surface of the cavity.

5. The injection molding machine as claimed in claim 1, wherein the gas feeding mechanism is configured to release the gas inside the cavity to the atmosphere in combination with the gas releasing mechanism during or after the injection of the foamable resin by the injection apparatus.

6. The injection molding machine as claimed in claim 1, wherein the sealing member comprises a plurality of ferrules.

7. The injection molding machine as claimed in claim 1, further comprising a slide core movably inserted into the one of the first mold plate and the second mold plate and configured to change a volume of the cavity.

* * * * *